(12) United States Patent
Witherspoon et al.

(10) Patent No.: US 6,767,505 B2
(45) Date of Patent: Jul. 27, 2004

(54) DYNAMIC CONSOLIDATION OF POWDERS USING A PULSED ENERGY SOURCE

(75) Inventors: F. Douglas Witherspoon, Fairfax Station, VA (US); Dennis W. Massey, Markham, VA (US); T. Arul Mozhi, Springfield, VA (US); David L. Kruczynski, Amissville, VA (US); John M. Ryan, Fairfax, VA (US)

(73) Assignee: Utron Inc., Manassas, VA (US)

( * ) Notice: Subject to any disclaimer, the term of this patent is extended or adjusted under 35 U.S.C. 154(b) by 139 days.

(21) Appl. No.: 09/902,784

(22) Filed: Jul. 12, 2001

(65) Prior Publication Data

US 2002/0025272 A1 Feb. 28, 2002

Related U.S. Application Data

(60) Provisional application No. 60/217,728, filed on Jul. 12, 2000.

(51) Int. Cl.$^7$ ................................................. B22F 3/14
(52) U.S. Cl. .............................. 419/45; 419/48; 425/78
(58) Field of Search .............................. 419/38, 48, 45; 425/78

(56) References Cited

U.S. PATENT DOCUMENTS

| | | | | |
|---|---|---|---|---|
| 4,166,375 A | * | 9/1979 | Stepantsov et al. ............ | 72/430 |
| 4,658,629 A | * | 4/1987 | Milisavljevic ............ | 72/453.02 |
| 5,405,574 A | | 4/1995 | Chelluri et al. | |
| 5,611,139 A | | 3/1997 | Chelluri et al. | |
| 5,989,487 A | | 11/1999 | Yoo et al. | |
| 5,996,385 A | * | 12/1999 | Kecskes ........................ | 72/56 |
| 6,001,304 A | | 12/1999 | Yoo et al. | |
| 6,004,120 A | * | 12/1999 | Matsubara et al. ............ | 425/78 |
| 6,183,690 B1 | | 2/2001 | Yoo et al. | |
| 6,187,087 B1 | | 2/2001 | Yoo et al. | |
| 6,325,965 B1 | * | 12/2001 | Makita et al. ................ | 419/38 |

OTHER PUBLICATIONS

Rusnak, R. M.; *Energy Relationships in the High Velocity Compaction of Copper Powder*; Int. Journal of Powder Metallurgy and Powder Technology, vol. 12, No. 2, (Apr. 1976); pp. 91–99.

Lennon et al.; *Explosive compaction of metal powders*; Powder Metallurgy, No. 1, (1978); pp. 29–34.

Lenel, F. V.; *Powder Metallurgy: Principles and Applications*; Chapter 4, Compacting; Metal Powder Industries Federation, (1980); pp. 99–157.

Raybould, D.; *Dynamic Powder Compaction*; The Carbide and Tool Journal, (Mar.–Apr. 1984); pp. 7–11.

(List continued on next page.)

*Primary Examiner*—Daniel J. Jenkins
(74) *Attorney, Agent, or Firm*—James Creighton Wray; Meera P. Narasimhan

(57) ABSTRACT

A gas operated part forming die apparatus has compact high tonnage presses which are operated by high pressure gas generated within chambers and controlled to operate high pressure pistons and dies for compressing particulate material into dense formed parts. Combustion chambers are filled with pressurized mixtures of combustible gases and diluents. Elongated chambers have insulating walls and spaced electrodes. Some contain liquid or particulate ablatable materials or ablatable liners. Others extend fuzes between the electrodes and are filled with pressurized gases. Gas is removed from the particulate material. Die cavities may be precompressed during filing of chambers with pressurized gas. Igniting the combustible gases or creating arcs between the electrodes produces rapidly expanding high pressure resultant gases for driving pistons and movable dies and rapidly compressing die cavities. Pressures in the chambers are contained, or pistons are restrained until releasing and driving the pistons. Large area pistons drive smaller movable dies.

66 Claims, 27 Drawing Sheets

OTHER PUBLICATIONS

German, R. M.; *Powder Metallurgy Science*; Chapter 5, Compaction; Metal Powder Industries Federation, (1984); pp. 113–233.

Gourdin, W. H.; *Dynamic compaction of metal powders*; Progress in Materials Science, vol. 30, (1986); pp. 39–80.

DeLuca, R. J.; *Description of Railgun Deposition Process, High energy high rate pulsed power processing of materials by powder consolidation and by railgun deposition*; Final Technical Report No. UTCMSE–87–02, App. B1 ( Univ. of Texas at Austin, (Feb. 1987).

Baird et al.; *Density–energy relationships in explosive compaction of metal powders*; Powder Metallurgy, vol. 30, No. 4, (1987); pp. 281–285.

Yadav et al.;*Study of Explosive and Shock Parameters for Compaction of Powders*; Propellants, Explosives, Pyrotechnics, vol. 15 (1990); pp. 194–200.

Prümmer, R.; *Explosive Compaction in Materials Science*; Metall. 51 Jahrgang, No. 6/97, (1997): pp. 333–335.

Baird et al.; *Energy Utilisation in Explosive Compaction of Metal Powders*; MPR, (Feb. 1986); pp. 143–145.

Hagemeyer et al.; *Dynamic Compaction of Metal Powders with a High Velocity Impact Device*; Int. Journal of Powder Metallurgy, vol. 4, No. 3, (1968); pp. 19–25.

Rosato et al.; *Manufacture of powder compacts*; International Materials Review, vol. 36, No. 2, (1991); pp. 45–61.

Tidman et al.; *Electrothermal Light Gas Gun*; IEEE Transactions on Magnetics, vol. 29, No. 1 , (Jan. 1993); pp. 621–624.

Dowding et al.; *Synthesis and consolidation of nanoparticles*; Advances in Powder Metallurgy & Particulate Materials, vol. 5, (1994); pp. 45–58.

ASM International Handbook Committee; *ASM Handbook, vol. 7, Powder Metal Technologies and Applications (Powder Compaction Methods)*; (1998); pp. 315–320.

\* cited by examiner

CDDC is in Regime Between HIP and Shock Consolidation

DYNAMIC CONSOLIDATION OF POWDERS USING A PULSED ENERGY SOURCE

This application claims the benefit of U.S. Provisional Application No. 60/217,728 filed Jul. 12, 2000.

This invention was made with Government support under Contracts DASG60-97-M-0115 and DASG60-99-C-0024 awarded by the Ballistic Missile Defense organization. The Government has certain rights in this invention.

BACKGROUND OF THE INVENTION

1. Field of the Invention

This invention relates in general to the field of powder metallurgy and in particular to an improved and less expensive method and apparatus for generating controllable pressure pulses (both in the shock regime and in a rapid, but shock-free, regime in the same device) for the purpose of consolidating (compacting) powders to a contiguous rigid form, primarily for the purpose of producing material samples and manufactured parts. In this field, the emphasis is generally on producing higher quality and better performing parts, which generally means parts with higher density, strength and ductility, and doing so at lower cost.

2. Description of Related Art

Powder metallurgy (P/M) offers possibilities for the design of materials into near net shape which exhibit a wide range of unique and novel properties. In principle, there is no limitation on the production of a material with any desired composition by such methods. However, the high cost of powder metallurgy technology must compete with other low cost manufacturing methods.

Below, we first describe two specific market areas (soft and hard magnetic materials) of some commercial interest as an example of the need. Other markets for other materials are of equal interest. The dynamic compaction of conventional powders using the described invention as a low cost high tonnage compact press is expected to have high value in the part manufacturing industry. Then we describe present powder consolidation technology and dynamic powder consolidation techniques and their limitations.

Soft Magnetic Materials

The world-wide magnetic materials market is a multi-billion dollar industry, and soft magnetic materials comprise a significant fraction of this market. Soft magnetic materials play a key role in a number of applications, especially with respect to electric power applications. Some of these applications include electric motors, distribution transformers, and generators.

Soft magnetic materials find applications in electrical, electronics, and computer systems that characterize modern society. Soft magnetic materials play a key role in power distribution, make possible the conversion between electrical and mechanical energy, underlie microwave communication, and provide both the transducers and the active storage material for data storage in information systems. As the properties of these materials are continuously being improved, many new applications are likely to emerge.

The critical properties necessary in designing optimum soft magnetic materials include a high saturation magnetization, low coercivity, low hysteresis loss, high permeability, low magnetostriction, low eddy current losses, high Curie temperature, low temperature dependence of the magnetic properties, and cost. In practice, the available materials must compromise some of these properties in favor of others. For example, permalloys (Fe—Ni-based alloys) have a tremendously high permeability and very low coercivity, but the saturation magnetization is only approximately 60 percent of the value for $\alpha$-Fe.

Many of the requisite properties are intrinsic, such as a high saturation magnetization and magnetostriction. These properties are tailored through the specific design of the alloy. Other properties are influenced by extrinsic factors, most notably by microstructural features. The magnetic properties strongly influenced by the microstructure are those involving domain wall motion. For example, the eddy current losses arise because soft magnetic materials generally operate in alternating fields. The losses arise primarily because of difficulties in reversing the magnetization state of the material. This, in turn, is controlled by domain wall motion; if domain wall motion is inhibited, the losses are greater. Microstructural features such as precipitates and localized strain fields from dislocations and impurity atoms provide pinning sites for domain walls. The eddy current losses also increase as the size of the magnetic regions increases and as the resistivity decreases. Thus, the eddy current losses can be reduced by reducing the coercivity and the scale of the microstructure and by decreasing the electrical resistivity.

The coercivity is affected by both intrinsic and extrinsic factors. Intrinsically, the coercivity is controlled by the specific anisotropy of the crystal lattice (magnetocrystalline anisotropy). While cubic crystals possess the lowest anisotropy, there is variability between different cubic materials. For example, the anisotropy constant (the parameter that describes the degree of anisotropy) differs by almost an order of magnitude between Fe and Ni. As with other intrinsic properties, the anisotropy can be altered through alloy design.

The primary extrinsic influence on the coercivity is the microstructure. The microstructure, in fact, influences the entire shape of the hysteresis loop. Some examples of microstructural features that influence the coercivity by affecting domain wall motion include defect density, including dislocations and point defects (e.g., impurity atoms). Therefore, it is critical to control microstructural features in order to produce more efficient soft magnetic materials.

One microstructural feature that greatly impacts the coercivity is the structural correlation length (D). In crystalline materials, the structural correlation length is equal to the grain size, while in amorphous materials it is essentially the distances over which short range order exists. As grain sizes decrease from the millimeter size range to approximately 0.1 $\mu$m, there is a corresponding increase in coercivity proportional to 1/D. However, when the structural correlation length approaches the ferromagnetic exchange length, which is on the order of the domain wall width, the coercivity begins to decrease. With a continuing decrease in the structural correlation length, the coercivity was observed to decrease with a $D^6$ dependence. This dramatic decrease in coercivity has been attributed to the averaging of local anisotropies by the exchange interactions, with the net effect of eliminating (or significantly reducing) the influence of magnetocrystalline anisotropy on the magnetization process.

The strong dependence of coercivity on the structural correlation length has prompted a significant amount of research in the areas of nanocrystalline and amorphous alloys, where D ranges from 0.5 to 50 nm. Amorphous alloys typically consist of Fe- or Co-based alloys with additions of Si and B, which enhance the glass formability, and other alloying additions to control, for example, the magnetostriction. Currently, nanocrystalline microstructures are formed by the crystallization of specific amorphous alloys, with the resulting microstructure consisting of 10 to 15 nm crystallites surrounded by an amorphous matrix. The primary advantage of amorphous and nanocrystalline alloys is the reduction of the anisotropy and, in the case of nanocrystalline materials, magnetostriction. Amorphous metals have been used in place of grain-oriented Si steels in transformer applications, which provided a reduction of 75 percent in eddy current losses because of reduced coercivity and magnetostriction. However, the saturation magnetization is significantly reduced, with values ranging from 10 to 15 kG for current amorphous and nanocrystalline alloys (compared to 21.5 kG for $\alpha$-Fe). The lower saturation values result from the dilution of the Fe or Co alloys with elements that enhance glass formability or alter other intrinsic properties. Future advances in soft magnetic materials will be made by increasing the saturation magnetization while retaining the advantageous properties of amorphous and nanocrystalline microstructures.

Generally, nanocrystalline and amorphous materials are produced in particulate form by atomization or melt spinning techniques. Practically, the consolidation of nanocrystalline and amorphous particulate into useful engineering devices provides many unique challenges. Most densification techniques rely on elevated temperatures to promote densification. However, exposure to elevated temperatures significantly degrades the hard-won microstructural features through crystallization and grain growth. Other techniques utilize binders, allowing low temperature consolidation. Using binders, however, dilutes the amount of magnetic material in the final part to, at most, 70 percent by volume, resulting in a lower saturation magnetization by volume in the final engineering component.

Dynamic consolidation techniques allow densification to full density without prolonged exposures to elevated temperatures and the concomitant degradation of the microstructures. Dynamic consolidation techniques utilize shock waves of sufficient strength to generate interparticle welding and melting, with temperature excursions essentially eliminated. Shock waves generated by, for example, explosives or projectiles have been utilized to densify rapidly solidified particulate materials in a wide variety of alloy systems, including magnetic materials. Most dynamic consolidation techniques, however, are not amenable for large-scale production techniques. Novel techniques to generate sufficient shock waves must be developed in order to fully realize the benefits of dynamic consolidation on a practical level.

Dynamic consolidation techniques are desirable to consolidate soft magnetic nanocrystalline and amorphous materials. Dynamic consolidation will allow full densification without deleterious effects on the microstructure. Thus, the benefits of nanocrystalline and amorphous microstructures on the magnetic properties can be retained in the final engineering component.

Hard Magnetic Materials

Permanent magnet materials significantly affect a wide spectrum of industries, with applications in such diverse areas as microelectronics, the automobile industry, medical devices, and power generation. Applications in permanent magnet motors alone require some 920 tons of fully dense and 770 tons of bonded Nd—Fe—B magnets annually. Currently, the permanent magnet industry is a $4.05 billion industry, with projections reaching $10 billion for 2005.

Hard magnetic materials find applications in the automotive, aerospace, and telecommunication industries. For their size and weight rare earth magnets, such as NdPeB, have a higher energy density than other hard magnets. These magnets are used in compact powerful electric motors for computer disk drives and fly-by-wire aircraft. They also find applications as high precision actuators used to focus the laser in a compact disk player and in miniature loudspeakers of personal stereos. Automotive applications include starters, small motors, alternators, sensors, meters, and electric and hybrid vehicle propulsion systems. These magnets are made from powdered metal by forming to shape under pressure and sintered.

Two materials comprise almost 90 percent of the hard magnetic market: ferrites (58 percent) and Nd—Fe—B (31 percent). With only modest magnetic properties, with a maximum energy product of approximately 5 MGOe, the principal advantage of ferrite is its inexpensiveness, especially in terms of raw materials cost. It is used in applications where size and weight are not design considerations. When magnetic strength is more paramount than cost, Nd—Fe—B magnets are favored. The energy product of isotropic Nd—Fe—B magnets range from 7–8 MGOe for bonded magnets to 15 MGOe for fully dense hot pressed magnets. The energy product of anisotropic Nd—Fe—B magnets range from 45 MGOe for commercially available products to 54.4 MGOe for magnets produced on a laboratory scale.

Requisite intrinsic properties necessary for high strength permanent magnets include a high saturation magnetization, large magnetocrystalline anisotropy, and a reasonably high Curie temperature. In addition, the properties of any real material are strongly influenced by extrinsic factors, most notably the microstructure. Such factors as the microstructural scale, phase content and grain morphology and orientation strongly influence a material's properties. These factors also greatly influence the magnetic properties, especially the scale of the microstructure. Superior properties arise when the grain size is below a critical limit known as the single domain limit. When the grain size is larger than the single domain limit, multiple domains are present in each grain. This multiple domain state leads to relatively easy demagnetization and poor hard magnetic properties. When the grain size is below the single domain limit, demagnetization is much more difficult, leading to excellent hard magnetic properties. The single domain limit is related to specific intrinsic magnetic properties, including the anisotropy constant and the saturation magnetization. For Nd—Fe—B magnets, the single domain limit is approximately 300 nm.

For isotropic permanent magnets, it is imperative that the grain size be below the single domain limit. Because of this requirement of a fine grain size, non-equilibrium processing techniques are required. Currently, the commercially preferred technique to generate a fine-scale microstructure is melt spinning. Depending on the processing parameters, melt spinning generates a microstructure that ranges from fine, equiaxed grains on the order of 20 to 30 nm to an amorphous structure that crystallizes during consolidation. It is critical to retain as fine a microstructure as possible upon further processing to optimize the magnetic properties.

Monolithic Nd—Fe—B permanent magnets useful in applications are produced by the consolidation of comminuted melt spun ribbon. Isotropic Nd—Fe—B permanent magnets, with energy products of approximately 12–15 MGOe, are consolidated by conventional hot pressing techniques. However, during the relatively prolonged times at elevated temperatures, grain growth occurs, resulting in deleterious effects on the magnetic properties. Anisotropic magnets are produced by die upset processing of the hot pressed magnets. Die upsetting results in crystallographic alignment through preferred grain growth. The high degree of crystallographic alignment results in higher energy products. However, the additional exposure to elevated temperatures during die upsetting further degrades the microstructure. The degradation in the microstructure and the limited crystallographic alignment achievable limits commercially available energy products to 45 MGOe, only 70 percent of the theoretical maximum of 64 MGOe.

On a laboratory scale, efforts have been made to retain the beneficial microstructural features produced during melt spinning. This has been accomplished through consolidation by shock and explosive compaction. These dynamic consolidation processes result in extremely short exposure to elevated temperatures, allowing the fine microstructures generated during melt spinning to be retained. The dynamically consolidated magnets retained the magnetic properties and microstructures of the initial melt spun ribbon. In addition, die upsetting of shock-consolidated amorphous ribbon resulted in an anisotropic fine-grained monoliths with an energy product of 54.4 MGOe (85 percent of the theoretical maximum).

The laboratory-scale tests illustrate the benefits of retaining a fine microstructure in the final consolidated magnet. However, scale-up of the previously mentioned dynamic consolidation techniques provide unique challenges. The development of other dynamic consolidation processes that limit the material's exposure to elevated temperatures while providing consolidation to near full density will provide a route to materials with improved magnetic properties. In addition, the development of processes that retain fine microstructures during consolidation would provide an avenue to commercially produce magnets utilizing novel magnetic materials that absolutely rely on a nanocrystalline microstructure, such as the recently discovered nanocomposite or spring-type magnets.

Non-magnetic Powders

The dynamic compaction of conventional powders (ferrous and non-ferrous) using the described invention as a low cost high tonnage compact press is expected to have high value in the part manufacturing industry because of higher green density and green strength in the resulting parts at faster compaction rates. According to the trade association, Metal Powder Industries Federation (MPIF), the P/M (powder metallurgy) parts and products industry in North America has estimated sales of over $2 billion. It is comprised of 150 companies that make conventional P/M parts and products from iron and copper-base powders; and about 50 companies that make specialty P/M products such as superalloys, tool steels, porous products, friction materials, strip for electronic applications, tungsten carbide cutting tools and wear parts, rapidly solidified powder products, and metal injection molding (MIM) parts and tool steels. P/M is international in scope with growing industries in all of the major industrialized countries. The value of U.S. metal powder shipments (includes paste and flake) was $1.9 billion in 1996. Annual worldwide metal powder production exceeds one million tons.

MPIF estimates the MIM North American market to exceed $100 M and to grow at an annual rate of 20 to 25%. There was an estimated 25 to 40 companies in North America manufacturing MIM products either as job shops or in plant departments. This growth rate is fueled by strong auto production and an increase in PM parts applications in auto engines and transmissions. The advanced particulate materials sector of the PM industry has a bright future, especially PM high speed tool steels, PM superalloys and composites, MIM and spray formed parts, materials, and fibers. PM parts and products made from advanced particulate materials will find new applications in automotive, aircraft engine, electronic packaging, computer peripheral equipment and medical markets. Looking ahead, PM nickel-based superalloys and advanced composites are being considered for the NASA high speed civilian transport plane. According to MPIF, the PM parts industry will outpace metalworking due to increases in applications for PM components, longer term growth of the industry will continue to gain metalworking market share, and the use of PM parts in industrial markets especially automotive is now widely recognized for contributing significantly to cost and performance competitiveness.

An example of advanced materials, is the intermetallic compound TiAl, possessing the ordered ($\gamma$-fct) structure, has attractive and unique properties for extended high temperature applications. Parts made of aluminides (TiAl, $Ti_3Al$, NiAl, $NbAl_3$, etc.) and other intermetallic compounds have potential for applications requiring light weight and high-temperature strength and oxidation resistance. Intermetallic compound powders made by rapid solidification processing (RSP) are brittle and hard, making it difficult to consolidate these powders by conventional techniques. The high temperature exposures for long times, involved in the conventional techniques, causes excessive grain growth and phase transformation of the initially RSP microstructure. Therefore, to ensure ductility and other desired mechanical properties these parts need to be formed by consolidation of the RSP powders. Also, room-temperature brittleness is a problem with conventional intermetallics. The challenge, then, is to develop powder consolidation techniques that do not adversely affect any enhancements due to RSP. Intermetallics are also used as matrices in composite materials. Here, the goal is consolidation without incurring excessive reactions between matrix and reinforcement.

Present Powder Consolidation Technology and its Limitations Conventional Powder Consolidation Techniques Several conventional consolidation techniques and their variants for particulate materials exist. These include die pressing, cold (CIP) or hot isostatic pressing (HIP), reactive sintering, powder injection molding, ceramic consolidation, and electroconsolidation which produce consolidated products.

Conventional powder compaction is performed by die pressing. The die provides the cavity into which the powder is pressed and gives lateral constraint to the powder. An external feed shoe vibrates the powder into the die. An upper and a lower punch are used for most compaction. Both punches are loaded to generate stress within the powder to produce the part. There are several modes of pressing and thus several types of presses including hydraulic, mechanical, rotary, isostatic, anvil, etc. These are all very large, noisy, complex, and expensive systems. The limitations of conventional die pressing include limited green density, limited green strength, green density gradients, need for binders and binder removal (a slow and expensive process), and shrinkage of parts during sintering.

CIP is used for complex shapes involving undercuts or large length to diameter ratios. A flexible mold is filled with powder and pressurized isostatically using a fluid such as oil or water. CIP is typically performed at pressures below 350 MPa (megapascals) although pressures up to 1400 MPa have been achieved. While higher green densities with less density gradients are reached at a given pressure when compared to die pressing, most of the other limitations of die pressing exist in CIP.

In HIP, a gas-tight can is used to contain the powder. Volatile contaminants are removed by heating and vacuum degassing. The can is then sealed and pressed in an internally heated pressure vessel. Argon gas at high pressure is used to transfer heat and pressure isotropically to the compact, leading to densification. After HIP, the can is stripped from the densified compact. This is a low strain rate process because the stress rise is slow. The long time exposures at high temperatures lead to grain growth and loss of the initial fine and rapidly solidified microstructures.

Several variants of reactive sintering have been employed to consolidate metallic and intermetallic materials. The basis of all reactive sintering processes is the formation of a liquid phase as a result of an exothermic reaction between elemental powders present in the mixture. The liquid phase accelerates consolidation and is consumed during the process. The reaction may proceed with no pressure (reactive sintering), with isostatic pressure (reactive hot isostatic pressing, RHIP) or unidirectional pressure (reactive hot pressing, RHP). As an example, the typical process steps for NiAl-20 volume % $TiB_2$ composite are as follows:

1) Ni and Al (along with $TiB_2$) are mixed to stoichiometric proportions.
2) Compacts are pressed to a green density of approximately 70% of theoretical.
3) Compacts are vacuum encapsulated in 304 stainless steel.
4) Encapsulated compacts are pressed at 1200° C. and 172 MPa for 1 hour.

A disadvantage with reactive sintering is the difficulties associated with HIP, which often accompanies or succeeds reactive processing, such as the need for ductile canning materials that do not react with the powders and the need to seal cans carefully. The expenses associated with welding HIP cans and expense of reactive metals such as Ti and Nb overcomes the low costs associated with reactive sintering step.

Powder injection molding involves extrusion of a mixture of powders, any reinforcements, and a binder through a die. The extrusion should be performed above the softening temperature of the binder. After extrusion the binder is removed (thermally or by wicking action) and the compact is consolidated to approximately full density by HIP. Fully dense $Al_2O_3$-reinforced composites of NiAl and $MoSi_2$ have been produced successfully by this method. This process offers the possibility of producing complex P/M parts. However, the principal disadvantages are the difficulty of complete binder removal and the inability to produce continuous fiber-reinforced composites.

The Ceracon (for "CERAmic CONsolidation") process uses a granular ceramic material as the pressure-transmitting medium (PTM) as opposed to the gas used in HIP. A preform of the material to be consolidated is preheated and immersed in the hot ceramic PTM. Pressures as high as 1.24 GPa ($180 \times 10^3$ psi) are applied to the preform via the PTM for 30 to 60 seconds. The uniaxial pressure applied to the PTM bed is transmitted to the preform as quasi-isostatic pressure, and consolidation of the part takes place in 30 to 60 seconds. Both the Ceracon and HIP processes operate in the plastic-yielding range and it is possible with the Ceracon process to produce full densification almost exclusively by plastic yielding, which is essentially instantaneous. The high consolidation pressure available, in the Ceracon process, permits the temperature to which the material is exposed to be relatively low (compared with HIP and hot pressing) and the exposure times to be short. This allows full densification of the material while maintaining the fine microstructure. In composite materials interfacial reactions between the matrix and reinforcement phases are minimized or eliminated. Critical parameters of the process include part temperature, PTM temperature, applied pressure, strain rate, preheat time and temperature, and hold time at temperature.

The electroconsolidation process uses graphitic-carbon particles, having controlled electrical properties, as both the PTM and as an electrical resistor for simultaneous heating and consolidation of powder preforms in a modified hot-pressing facility. This technique is being evaluated for rapid pressure-assisted densification, to near-net shape, of metal and ceramic powder preforms, whisker-reinforced ceramic composites, and other materials that require, or could benefit from, pressure-assisted consolidation at very high temperatures. Electroconsolidation is a member of the family of "soft" tooling, pseudo-HIP, or containerless-HIP consolidation processes that use a particulate "pseudo-fluid" as the PTM. A cold preform is heated to the consolidation temperature by resistive heating of the surrounding medium, within the die, simultaneously with the application of the compaction pressure. This "inside-out" method of preform heating is particularly advantageous for densifying nonoxide ceramics and other materials that require very high temperatures for consolidation to near theoretical density. Such temperatures are difficult to achieve by other powder-vehicle compaction methods that require transfer of either a preheated preform or the heated medium into the compaction vessel. In development work, a 50-t (55 ton, 490 kN) and a 100-t (110 ton, 980 kN) presses were adapted for electroconsolidation. Electroconsolidation was demonstrated to compact SiC preforms to near-theoretical density. The cold compacted preforms were oven dried, baked, and then heat treated at 1500° C. Electroconsolidation followed, using a compaction pressure of 28 MPa (4000 psi) and a nitrogen atmosphere. At power levels above 20 kW rapid densification was obtained; densities of 90+% and 95% of theoretical were obtained in less than 2 minutes and 4 minutes respectively. Parts were rapidly heated by the conductive medium to about 2000° C. (3630° F.). Advantages of the process, compared with conventional hot pressing and HIP, include: rapid cycle times (minutes versus hours), high temperature capability (to 3000° C., 5430° F.), controlled atmosphere capability (inert or active gases), and the ability to densify complex shapes without "canning". Because densification is rapid, this process has the potential for inhibiting grain growth, resulting in fine-grain parts having the improved mechanical properties associated with this fine microstructure. In addition, high-vacuum or high-pressure pumps are not needed, and the ability to adapt existing hot-pressing systems can help keep equipment costs down.

Materials Modification, Inc., (MMI) has developed and patented a powder consolidation technique called Plasma Pressure Compaction (U.S. Pat. Nos. 6,187,087; 6,183,690; 6,001,304; 5,989,487). This is based on the plasma activated sintering (PAS) technique published by several investigators. In the PAS process, densification is achieved by a combination of resistance heating with pressure application and plasma generation among the powder particles. The time for high temperature and pressure application is short, of the order of minutes rather than hours, to reach full densification. Difficult to sinter materials such as covalent ceramics, oxygen sensitive intermetallic compounds, and superconductors have been consolidated by PAS. MMI's Plasma Pressure Compaction technique claims to consolidate submicron and nanomaterials (metals, intermetallics, and quasiceramics) at reduced consolidation time, lower oxygen content in the final part, higher density (tungsten to 97% and rhenium to 96% dense), and reduced processing temperature.

Dynamic Powder Consolidation Techniques

In addition to the above conventional techniques and their variants, there are dynamic consolidation techniques which use explosives, impact, and pulsed magnetic forces to yield full densities. Dynamic (shock) consolidation and synthesis of materials have been used to a considerable degree in research activity on materials development. Shock-wave consolidation of powders was used for the first time in the 1950's to produce high density parts from materials used in aerospace and atomic energy applications. Dynamic consolidation has the potential to meet the challenges to consolidation of advanced materials such as intermetallic monolithic and composite materials, and become a cost effective technique for fabrication of intermetallic-based parts.

Conventional powder-consolidation methods, such as sintering and HIP, typically involve long times at high temperatures, and rely on solid-state diffusion. Dynamic consolidation typically involves high-pressure shock waves that travel at several kilometers per second through the sample. These shock waves are generated in the sample by various methods including detonating explosives to accelerate a "flyer plate" into the powder sample or using a gun to fire a projectile into the sample. Larger samples generally can be produced with explosives, while use of a projectile generally allows better control and measurement of experimental parameters such as impact velocity. Processing is generally achieved by discharge of a single high-energy pulse through a pressurized powder blend. Applied pressures range from 210 to 420 MPa and the specific energy inputs varied between 3200 and 4800 kJ/kg. Consolidation occurs by diffusion through a thin layer of liquid that is temporarily created between particles. As the shock wave passes through the powder, it gives up most of its energy at particle boundaries, possibly because of interparticle friction. Partial melting occurs near these boundaries, and the liquid rapidly solidifies by heat conduction into the relatively cool particle interiors. Dynamic consolidation can therefore be considered a "cold" method. Details of the actual consolidation mechanism depend on the powder and processing conditions. For example, solid-state bonding of particles sometimes occurs without partial melting, and melting may be caused by adiabatic heating generated by plastic deformation of particles, rather than by interparticle friction. Scientists at Rockwell International have dynamically consolidated rapidly solidified γ-Ti-48Al powder using explosive-launched stainless steel flyer plates. This dynamic consolidation resulted in a nonequilibrium single-phase alpha-2 ($DO_{19}$) structure. When the same powder is hot pressed, the equilibrium lamellar mixture of 85 to 90 volume % γ and 10 to 15 volume % α-2 phases result. Rockwell scientists also dynamically consolidated Sic/Ti—Al—Nb composites resulting in a uniform dispersion of the SiC fibers in the aluminide matrix with a safe and very thin (50 nm) fiber/matrix reaction zone. The same composite when hot pressed resulted in a thick (more than 1 micrometer) fiber/matrix reaction zone that is deleterious to the fracture properties of the composite.

Potential advantages of dynamic consolidation, as identified by previous investigators, include:

Nonequilibrium microstructures produced in rapidly solidified powders can be retained in the compact. Consolidation occurs so rapidly that there is not enough time to re-establish equilibrium.

For the same reason above, composite materials can be fabricated with very thin reaction zones between matrix and reinforcement. This minimizes the formation of brittle reaction products that can degrade composite fracture properties.

Many powders that are extremely difficult or impossible to form by other methods can be dynamically consolidated. For example, some powders are so brittle that conventional isostatic pressing may cause excessive particle fractures.

Dynamic consolidation has the potential for fabricating net-shape parts.

Although most samples produced to date have been small (centimeter size), the process can, in principle, be scaled up to produce large (meter size) compacts.

Even though dynamic consolidation can offer significant inherent advantages and versatility in forming both metallic- and intermetallic-based monolithic and composite materials, it is important to recognize that the method is still very much in the development stage, and major problems need to be addressed. For example, methods of precisely controlling process parameters and obtaining uniform samples must be developed. Cracking is another problem that must be solved. When the powder-consolidating shock wave reaches a free surface, it transforms into a relief wave that can fracture the sample. Also, the rarity of kinetic energy storage machines and the small sizes of samples produced to date make it difficult to predict whether kinetic energy discharge is a commercially viable way to consolidate powders.

The techniques discussed above are in various stages of R&D and prototype development.

Other alternative approaches for dynamic consolidation of powders are being pursued. For example, dynamic magnetic compaction (DMC) described in U.S. Pat. Nos. 5,405,574 and 5,611,139 is a process which claims to consolidate powders into full density parts in less than a millisecond. In this process, high currents are passed through a compactor coil, at the center of which is a powder container. The current in the coil generates a magnetic field, which in turn applies magnetic pressure up to 1400 MPa (200 ksi) to the powder (300 MPa is typically achieved), in two orthogonal directions. The pressure consolidates powders such as high-strength steels, titanium-nickel intermetallics, tungsten alloys, and superconductor ceramics. The process claims to consolidate powders at room or elevated temperatures in any controlled atmosphere, and claims that the forces can be controlled with precision. So far, the process has been used to compact small sized shapes (rods and bars 2 to 20 cm long and up to 2 cm thick); although it is claimed that there is no fundamental size limitation. One limitation of DMC is the general need for post sintering, under a reducing atmosphere such as hydrogen, or HIP to complete grain bonding. At the DMC pressures typically achievable (300 MPa) grain bonding is generally not complete. Note that the quoted peak pressure of 1400 MPa apparently leads to damage to the coil, and a consequently limited lifetime. Making survivable coils which can operate repetitively at pressures above 5–6 kbar is difficult.

All known techniques, both static and dynamic, are in general not cost effective compared to conventional wrought processing techniques and none of the dynamic techniques have generated any significant commercial activity. Therefore, cost effective consolidation techniques are needed which can produce near theoretical densities (i.e. nearly 100%), can enable sintering at lower temperatures to obtain preferred microstructures, and can allow fabrication of conventional die presses of small size and lower expense.

SUMMARY OF THE INVENTION

To our knowledge, no one else is developing powder consolidation techniques based on high pressure combustion as described further below, or the electric discharge variants also described below. The technology of pulsed high pressure combustion and pulsed electrical discharge heating of working fluids provide an innovative solution to address the above described technology limitations. The invention utilized in a single shot mode has utility in the advanced materials research and development community where high production rates are not generally needed, while a repetitively operating device would have clear utility in the parts manufacturing industry such as the automobile industry.

This invention provides new and improved methods and apparatus for controllably generating large pressure pulses for consolidating, i.e. compacting, powders consisting of metals, metal alloys, ceramics, and mixtures of these to form bulk objects.

This invention provides methods and apparatus for generating the large pressure pulses which push against a piston, or ram, to transmit the pressure to the powder to be consolidated. The piston may have an area ratio from one end to the other such that the pressure pushing on the piston is intensified on the end which compacts the powder.

This invention provides methods and apparatus for generating large pressure pulses which can be incorporated into an automatic press system for manufacturing parts, and for single shot production of sample materials for research and development purposes.

This invention provides methods and apparatus for consolidating powders to higher densities than can be achieved by conventional die pressing.

This invention produces large pressure pulses in manufacturing presses by the combustion of mixtures of confined high pressure gases.

This invention produces large pressure pulses in manufacturing presses by the rapid heating of confined pressurized gases by a high powered electrical discharge in a confined volume.

This invention produces large pressure pulses in manufacturing presses by the rapid heating of ablated material resulting from an arc discharge in a confined so-called capillary structure, the ablated material originating from the walls of the chamber or from liquid or solid materials placed into the volume.

Still another object of this invention is to provide a method and apparatus for consolidating nanophase or nanosized powders (be they magnetic or non-magnetic) at substantially room temperature or at temperatures of a few hundred degress Celsius, and to perform the consolidation during a time so short that grain growth is reduced or eliminated altogether.

Still another object of this invention is to provide a method and apparatus for providing the means for pressing powders into net shape parts in a manner which is less expensive than conventional presses, is more compact than conventional presses, and produces less noise than conventional presses.

A further object of this invention is to provide a method and apparatus for providing means for pressing powders into net shape parts without necessarily requiring the use of binders or lubricants within the powder mix, thus eliminating the need for removing such materials prior to sintering or use of the part, reducing or possibly eliminating altogether the shrinkage of parts during the removal process, and also increasing the green strength of parts made by the method of the present invention.

These and other objects of the invention are achieved by providing methods and apparatus as described below.

The present invention is a new and innovative approach to powder metallurgy applications in which the compaction, i.e. the consolidation, of powders occurs on millisecond time scales at substantially room temperature and at consolidation pressures that can be much higher than are practical in conventional die pressing. Conventional industrial die pressing occurs at peak presures of about 50 tons per square inch. The present invention operates over a wide range of compacting pressures, operating not only at or below the pressures of conventional die pressing, but also and with great efficacy at pressures several to many times this value. This occurs without die cracking or part cracking and delamination seen in conventional die pressing when that apparatus is operated substantially above the typical value of 50 tons per square inch. A conventional die press operated at the high pressure obtainable with the present invention would lead to near immediate failure of the die. The reason for this is not understood yet, but appears to be related to the speed of the consolidation in the case of the present invention relative to that of conventional die pressing.

The present invention utilizes high pressure pulses, produced by the combustion of a mix of gases, to consolidate powders. The invention is versatile and can be applied to various material systems such as metal and alloy powders, intermetallic-based powders, ceramics, composites, nanophase materials and their composites.

The invention is innovative because:

1) it utilizes high pressure gases to perform consolidation of powders, and the high presure gases are produced by either a combustion of prefilled high pressure gases or by pulsed electrical heating of contained gases, liquids, or solids to produce high pressure gases;

2) pressures ultimately in the range 200–500 kpsi can be generated and successfully utilized and can be tailored by controlling the gas mixture ratios in the case of combustion or by control of electrical parameters in the case of electrical heating;

3) pressure durations are short compared to conventional die pressing operations, being typically hundreds of microseconds up to a few tens or hundreds of milliseconds, allowing high rep-rates for powder consolidation in potential industrial or commercial applications;

4) it provides the potential for dynamically compacting components of large size relative to other processes dynamic compaction processes;

5) the pressure time history is controllable to provide additional process control; and 6) it allows compaction of powders without requiring the use of binders or lubricants, thus leading to significantly increased green strengths and reduced part shrinkage during sintering.

The methods of this invention consolidate powders via controllable, high pressure pulses produced by the combustion of high pressure mixes of combustible gases and diluent gases. A typical mixture might be methane, oxygen and argon given by Ar+ϵ(CH$_4$+2O$_2$), where ϵ is a number usually between 0 and 1, but could theoretically also be larger than one using well distributed ignition systems. Typically, ϵ is about 0.05–0.30. Other gas mixtures using hydrogen, helium, and nitrogen (or even air) could also be used. In fact, almost any combination of combustible gas mix and diluent could be used, but practical choices are typically limited to methane, oxygen, and a diluent gas consisting of argon, helium, or nitrogen. The chamber is pre-pressurized with the gas mix to pressures as high as 20–30 kpsi, depending on the final peak pressure desired. A diaphragm, or a tight fitting seal, contains the gas prior to ignition, and bursts at a predetermined value above the prefill pressure, but below the peak combustion pressure. When it bursts, the pressure is then transmitted to a pusher piston which moves to compact the powders. The diaphragms can be either burst or shear type. If a tight fitting seal is used, then the piston actually leans against the powder,-exerting the prefill pressure on the powder prior to ignition.

The present invention consolidates powders using substantially conventional die and punch fixtures, but replaces the conventional mechanical flywheel assembly or the conventional hydraulic piston assembly of conventional presses with a more compact, higher performance gas combustion system which acts directly on a piston (also called a ram) or other pressure transmissive medium to transmit pressure to the powder to be compacted. The piston and movable die or ram may have a one to one area ratio, or may have an area ratio larger than one, for example 5, or 10, or more. In the latter case, the so-called intensifier ratio causes the pressure on the powder to be increased substantially over that of the direct combustion products pressure. This allows consolidating pressures significantly higher than could otherwise be achieved by direct exposure of the combustion gases onto the powder or pressure transmissive media, or to allow more moderate peak pressures to be utilized in the combustion chamber for a given powder compaction pressure. The trade off is selected based on the part being made and the desired material properties.

In the most preferred embodiment of the invention, the basic dynamic powder consolidation device includes a main combustion chamber sealed at one end (top) with an end cap and a chamber plug which are held in place by multiple bolts. The chamber plug incorporates ports for an ignition device (described later), gas fill, and controllable-gas vent. The plug may also contain other devices such as pressure gages or thermocouples (not shown). The combustion chamber is equipped with a stainless steel liner to reduce wear and heat damage to the main chamber. At the opposite end of the chamber is a compaction ram that acts as a moving sealed piston and ram, to compact the powder.

The compaction ram incorporates several static o-ring type and several dynamic piston rings seals to seal both the initial fuel gas and the pressure induced during its combustion. In addition, a dynamic Bridgman type seal typically made from 316 Stainless Steel is used at the back end or combustion side of the ram. This seal is fashioned after similar seals used in gun projectiles to seal combustion gases dynamically. However, unlike one use projectile seals this seal operates repeatedly. This combination of static and dynamic seals can seal the chamber under its various operating conditions at pressures ranging from 1 to 100 kpsi.

The ram being exposed to the combustion gases at one end is typically made from similar materials as the combustion chamber itself (i.e. 4340 alloy steel). The chamber and plug are typically constructed from a high strength steel alloy such as 4340, while the liner is typically made from a stainless steel alloy such as 17-4 PH. The volume of the chamber is sized to deliver a set force from the ram at a defined chamber pressure. For example, if 300,000 pounds of force are to be delivered to a ram having an effective area of 12.5 square inches the pressure inside the chamber must reach 24,000 psi or 300,000/12.5. As the ram moves, the pressure in the chamber should always meet or slightly exceed this value. To ensure this occurs the chamber should be large enough that the change in volume caused by the ram motion, and subsequent powder compaction, does not cause the chamber pressure to drop below the desired value. In most cases, a ratio of chamber volume to ram drive volume of 10 to 1 is sufficient. Therefore, the design chamber volume is based upon the ram peak load, ram area (diameter), and peak chamber operating pressure set by the user as well as the expected travel of the ram during compaction. Generating the desired combustion pressure inside the chamber is dependent of the parameters of the fuel gases as described later.

In operation the powder to be compacted is typically loaded into a die located on a table directly under the ram. Any orientation of the apparatus can be accommodated, but the simplest is the conventional vertical approach which most simply allows the powder to be poured into the die prior to compaction. A combustible gas mixture is then fed into the chamber through the fill port. Typical gas mixtures used include but are not limited to, methane (or natural gas) and air, methane-oxygen-helium, methane-oxygen, hydrogen-air, hydrogen-oxygen-helium, and hydrogen-oxygen. Other gas mixtures include propane-air, acetylene-air, ethylene-air, and ethane-air. The preferred mixture for operation due both to it availability and high vapor pressure is methane-air or natural gas (mostly methane) and air. Although many fuel-air ratios can be used in the process, typically the mixture fuel-air (oxidizer) ratio is one. A fuel-oxidizer ratio of one provides the maximum amount of chemical energy for a given amount of products. Different constituent mixtures (e.g. methane-air or hydrogen-air) provide the same peak combustion pressure provided the differences in their respective heat of combustions is accounted for in the total amount of fuel used. The rate at which the energy is delivered to the ram is however dependent on the mixture's composition. For example, at the same delivered ram pressure hydrogen-air mixtures will reach peak pressure nearly ten times faster than methane-air mixtures. The final time to reach peak pressure is dependent on the mixture, the number of ignition sites, and the geometry and volume of the combustion chamber. In testing to date rise times from 2 to 400 ms have been obtained. In normal combustion, peak chamber pressures range from 20 to 65 kpsi. Although higher pressures are possible, it is generally desirable to run the device at the lowest pressure consistent with the desired ram load as this prolongs the chamber fatigue life.

In the most preferred embodiment, the chamber is operated such that combustion and not detonation of the reactants is obtained. Operation in detonation mode is however not only feasible, but potentially useful for some applications. Mixtures with low diluent levels relative to their oxidizer (e.g., oxygen/nitrogen for air mixtures) can be detonated under the proper conditions in the chamber. Detonations are extremely rapid compared to deflagrations in a combustible gas mixture and can be used to decrease compaction time of some powders to sub milliseconds levels. Although detonations are typically avoided because they tend to increase local pressures levels dramatically, they can be used if the device is designed for such use.

Regardless of the mixture or mode of energy release used, the gases are provided either directly from standard gas supply bottles or tanks or natural gas feed lines. In the case of air the high-pressure supply (up to 10,000 psi) can be provided directly from the ambient atmosphere through a series of compressor stages.

In most of the configurations, operation without using diaphragms to contain the prefill combustible gas is possible. It is only necessary to have a tight fitting piston or other seal to prevent the combustible gases from leaking into the precompaction powders, which in general would be undesirable. It appears to be desirable to provide a mechanism for pumping out any gases within the powder prior to compaction. This can be accomplished using a small vacuum pump and access holes, or by loading the powder into the compaction chamber while under vacuum.

The most preferred embodiment operates without a retaining diaphragm. The piston is itself constrained from moving prior to combustion by the powders themselves. Thus the powders are initially placed under a pre-consolidation pressure equivalent to the gas prefill pressure, multiplied by whatever intensifier factor the piston might have.

In one configuration of the device a diaphragm was used to separate the combustible gases from the ram and compaction powders. In the diaphragm configuration, the diaphragm is typically made from a high strength steel alloy such as Inconel and is designed to open at a pressure well above the fill pressure but below the expected peak combustion pressure. When this design failure pressure is achieved the diaphragm opens in a controlled manner at pre-defined scribe marks exposing the ram to the combustion pressure and pressing the powder. In later configurations of the device the diaphragm is removed and the sealing function is taken over by the ram itself as previously described.

With the diaphragm free design, as the chamber is pressurized with the fuel gas, the ram is pressed against the part die with a pressure equal to the final chamber fill pressure multiplied by the area of the ram. This pre-load on the die and powder is a unique feature of the device that allows the powder to be partially compacted before the fuel gas is ignited and the main compaction load is induced. This preload also removes entrapped air in the powder. At a pre-determined gas fill pressure the fill port is closed using a high-pressure valve (not shown). A high voltage is then transmitted to the igniter causing an electrical arc to occur at the tip of the igniter.

Ignition of the CDDC (Combustion Driven Dynamic Compaction) can be accomplished using a fairly wide variety of sources, including spark discharge, exploding fuse wires or foils, high voltage breakdown of small electrode gaps, drawn arc discharge between rapidly receding electrodes initially in contact, pulsed lasers, battery and induction coil, high voltage capacitors, pyrotechnics, or the UTRON CoilCap High Voltage Pulse Generator (Patent Pend. U.S. Ser. No. 09/372,109, filed Aug. 11, 1999, now U.S. Pat. No. 6,355,992, the disclosure of which is incorporated herein by reference), to name a few.

Typical ignition energies for experiments to date have ranged from about 2 Joules to about 6 Joules. Higher energies lead to faster pressure rise rates. Lower energies lead to long slow burn rates initially.

We utilized simple aluminum fuse foils stretched between the electrodes and driven by a capacitor bank with a stored energy of up to 4 kJ.

Other burn rates in later hardware have been slower, as shown in FIG. 32, reflecting the much lower ignition energy utilized. It should be noted that the lower energy ignition provides one technique for operating at higher $\epsilon$ values without detonation.

An additional technique for avoiding detonation in these high pressure mixes is to utilize multiple site ignition points. If the ignition points are distributed appropriately throughout the volume of the gas, the gas is essentially divided into a series of virtual chambers, each of which is too small to support formation of detonation waves. Deflagration waves then do not have room to transition to detonation waves before they interact with another one of the virtual chambers in which the gas has already combusted.

The ignition stimulus provided by the igniter can be delivered by several means. A surface discharge design utilizes an inert surface between the positive and negative electrodes to conduct the arc at relatively low voltage independent of the pressure of the surrounding gas. In a gap discharge design the arc must be made between the electrodes through an "air" gap that is actually composed of high-pressure fuel gases (e.g. methane-air). This design requires a higher initial breakdown voltage than the surface discharge approach. Another ignition concept involves the use of an "exploding wire". In this approach a thin conductive wire is attach to both the positive and negative electrodes. Upon receiving sufficient current the wire quickly vaporizes creating an arc path between the electrodes. Regardless of the arc ignition scheme the energy delivery system is composed of a high voltage coil and/or capacitor triggered by a signal from the user or computer under the user's control. In some cases it is desirable to use multiple igniters either to provide redundancy in the ignition process and/or to reduce the time it takes to ignite the mixture. For example two igniters both located at the top of the chamber would provide some ignition redundancy in the system but little increase in combustion speed as the ignition waves propagates and quickly merge into one single combustion wave front. If the igniters were however located at opposite ends of the chamber and energized simultaneously, the time to complete the combustion would be decrease by a factor of two as two distinct combustion waves traveling from separate sides of the chamber consume the fuel entirely before merging at the center of the chamber. The number and location of igniters is then dependent on the geometry of the chamber, the speed of combustion desired, and the need for redundancy to ensure 100 percent ignition reliability. To date only one igniter has been used, however it is very likely that final designs, particularly larger ones, will incorporate multiple ignition sites.

Once ignited, a combustion wave will propagate from the ignition point outward to all regions of the combustible gas mix. The resultant pressure rise during this combustion will cause the ram to press down further on the compaction punch with a force dependent on the final combustion pressure times the area of the ram. The powders encased in the die are compacted rapidly at room temperature. The die can incorporate heating elements if warm powder compaction is desired. When designed with an appropriately large internal volume combustion chamber, the force applied by the ram is relatively constant independent of stroke length. Current mechanical or hydraulic presses have wide variances in stroke length versus ram load. Load cells located under the die measure the load applied.

The burn rate and the pressure time history of the combustible gases is controlled by the gas constituents, the mix ratios, the amount of diluent, the ignition energy, the number and placement of ignition sources, and the prefill pressure. Burn rates all the way from very slow rising pressure burns to extremely fast detonation modes are possible by simply adjusting these parameters appropriately. Increasing the amount of diluent typically slows the burn rate, as energy is soaked up by the additional degrees of freedom, and generally provides some protection against detonation.

In most operational cases of interest here, consolidation appears to occur without producing sharp shock waves, only weak shocks, but this needs to be confirmed experimentally. There is one case, however, where sharp shock waves could be produced, and that is when a detonation of the combustible gas mix occurs. Typically this can occur for high $\epsilon$ mixes of fuel, oxygen, and diluent, and also when only one ignition point is used in conjunction with high ignition energy and a geometry conducive to transitioning a deflagration wave into a detonation wave (typically long narrow geometries). Detonation wave operation exposes the hardware to the highest possible stresses and is generally to be avoided. But if such sharp shock conditions are desirable for a particular material system, the chamber can be readily designed to accommodate shocks to high peak pressures.

The ram can be composed of multiple parts designed to apply different loads to the compact. In this concept a series of nested or segmented rams can be used to simultaneously apply varying loads to multiple parts of the compact simulating to some degree multiple platen and ram operations performed in current conventional presses.

The single piston configuration shown in the earlier figures can also be configured with dual pistons and dual pressure chambers compacting powders from two sides, as is already done with conventional powder metallurgy. One can also easily imagine using 4 or 6 or more pistons located symmetrically surrounding the powder and compacting from many sides.

After the ram has reached full extension, an exhaust valve is opened releasing the backpressure on the ram and porting the gas to the compact extractor. The ability to utilize the pressurized exhaust gas to extract the compacted part from the die is an additional unique feature of the device. Current presses require a separate mechanism and energy source to extract the compacted part. As the combustion gases are exhausted the ram is retracted to its original position by spring or hydraulic retractors attached to the ram. After the combustion products have been vented through the final vent valve, the process can be repeated. At a sufficiently high rate of production waste heat build-up will become a problem and is addressed by the incorporation of a cooling jacket installed in and around the combustion chamber. A computer controlled operating system set-ups, controls, and sequences all operations based on initial user input.

As with conventional presses, the present invention will most typically be incorporated into and supported by a steel frame composed of heavy welded frame members. The frame supports the compaction chamber over an adjustable table which supports the die under the chamber ram. The specific configuration and design of this supporting structure would be dependent on the part being made and the needs of the end user.

The CDDC technique is a dynamic compaction process with a typical expected pressure pulse width of between several hundred microseconds and a few tens of milliseconds. Thus the densification process is dynamic, in distinct contrast to static pressing. The mechanism of powder compaction in CDDC is expected to be somewhat similar to that of shock and explosive consolidations, but with greater control of the pressure time history. Both are dynamic processes occurring via wave propagation. In CDDC, no debonding or rarification effects due to reflections of the pressure wave are expected. In CDDC, detonation effects are usually to be avoided, but design for detonation can provide the option of shock wave like operation.

Molecularly complex diluents also tend to be better at preventing formation of detonation waves, as they have a greater ability to absorb energy into internal degrees of freedom, and thus slow the combustion-deflagration-detonation transition. In some cases additional fuel, i.e. fuel in excess of stoichiometric can act as a diluent.

The combination of multiple-site, low energy ignition, and high diluent levels allow the CDDC to operate without detonation at very high fill pressures. Note that if prefill pressures are to be minimized (for practical reasons) the value of epsilon (amount of fuel) should be maximized.

In another preferred embodiment of the invention, the high pressure gases are produced not by a combustion process, but by an arc discharge in a pressurized gas. In this embodiment, the combustion chamber of the most preferred embodiment is replaced by a chamber with an insulating wall, with electrodes located at opposite ends of the chamber. The chamber is first pressurized to high pressure with a working gas. A fuse is placed in contact with each electrode across the length of the chamber. A diaphragm or a tight seal contains the high pressure gas. When an external switch is closed, high voltage from energy storage capacitors is placed across the fuse, which quickly vaporizes and causes an arc to form in the high pressure gas. The high power arc quickly heats the gas, causing the pressure to rise to a high value, bursting the diaphragm and forcing the pusher piston to compact the powders. In principle, any working gas could be used, but in practice, it is probably best to use inert gases such as argon. The expected operating parameters and requirements for the repetitive device are similar in nature and order of magnitude to those for the combustion version of the present invention.

The insulating wall would be a ceramic coating or a ceramic tube jacketed by a heat shrunk steel tube to contain the ceramic and always keep it in compression. A ceramic insulating wall is ideally nonablating and would thus last indefinitely. A diaphragm is generally necessary to contain the high prefill pressure of this preferred embodiment, but not absolutely necessary if prefill presures were limited to only a few thousand psi.

Current to the discharge is typically supplied by a Pulse Forming Network (PFN) and high voltage charging circuit. FIG. 35 shows a representative example. When switch S (an ignitron) is closed, high voltage is switched across the electrodes, followed by heating and vaporization of the metal foil fuse. The PFN capacitance and inductance values determine the pulse width of the current. The pulse width $\tau$ is given by $\tau=2CZ$, where C is the total PFN capacitance, $Z=(L/C)^{1/2}$ is the PFN impedance, and L is the total PFN inductance. The inductance can be distributed among the capacitors to provide pulse shaping. The charging voltage and the circuit impedances determine the peak current. Discharge resistances are typically about 100 m$\Omega$. The ideal transfer efficiency from the PFN to the discharge load is given by $\eta=4(R/Z)/(1+R/Z)^2$. For matched loads, the transfer is 100%. This cannot be achieved in practice because of parasitic losses in the switch and leads, but these losses are typically small. Note that even for a grossly mismatched circuit in which $R=Z/2$, the transfer efficiency has only dropped to 89%. Expected bank voltages could go to a few tens of kilovolts, with discharge currents exceeding 100 kA in some cases.

In yet another preferred embodiment of the present invention, high pressure gases are produced not by a combustion process but by an arc discharge in a confined capillary. The gases are produced by the ablation of a consummable electrically insulating wall in the presence of a high temperature arc discharge, or by ablating and vaporizing solid or liquid materials placed into the confined capillary channel such that the liquid or solid material is directly exposed to the high temperature arc discharge.

A variation of the Electric Discharge Dynamic Consolidation configuration described above, called ElectroThermal Discharge Consolidation is accomplished by stretching the length and/or reducing the inner diameter of the high pressure region into a configuration often referred to as a capillary. It is called a capillary because of its high length/diameter ratio, which can typically be on the order of 10 to 1, sometimes more. Electrodes are again located at each end of the capillary. The working fluid is typically produced by ablating a plastic liner and/or by vaporizing various liquids, gels, or solid materials placed inside the capillary volume.

In the case where the working fluid is provided by ablating and vaporizing fill materials placed within the capillary, the insulating wall would typically be a ceramic coating or a ceramic tube jacketed by a heat shrunk steel tube to contain the ceramic and always keep it in compression. The ceramic insulating wall is thus ideally nonablating and would thus last indefinitely. This is the same functional form as for the EDDC configuration but with different length/diameter ratios.

The arc discharge again produces a very high pressure with a rapid pressure rise rate. The pressure profile is primarily controlled by adjusting the parameters of the inductors and capacitors in the pulse forming network driving the arc current as was also the case for the EDDC configuration.

This configuration does not necessarily require the use of a burst diaphragm, since no high pressure prefill gases need to be contained. However, a diaphragm could be used to provide a sudden pressure transfer to the compacted part as the diaphragm bursts or shears in the case of a shear diaphragm, if such were desired. A piston transfers the pressure to the powder to be compacted. Arc initiation is accomplished either with a fuse or by high voltage breakdown.

The use of pulsed electrical energy to heat the working gas eliminates the need for dealing with combustible gas mixes, a potential safety advantage in some cases, and also provides the potential for greater control over the pressure time history via means of controlling the arc discharge current.

The combustion technique is probably the approach of choice when very large energies are required for large compacts, since providing pulsed electrical energies of tens or hundreds of Megajoules is difficult and expensive, but easy and cheap with chemically supplied energy in the form of combustible gases. The pulsed electrical energy approaches described below seem to be best suited for smaller compacts requiring no more than a few Megajoules of energy, but is certainly not limited to such a value.

Additional configurations and features add benefits and capabilities to the basic approach.

In a separate configuration the die is replaced by a fluid filled chamber in which a powder sample is placed after being encapsulated in a flexible mold. The ram then compresses the suspension fluid (e.g., water), which in turn uniformly hydrostatically compacts the powder sample. The method and apparatus of the most preferred embodiments described earlier can be modified to allow this isostatic compaction in which the high pressure gas surrounds the part being compacted rather than being compacted by pressing of a piston or ram. The powder must then be contained within a "can" to provide the initial rough shape of the part. In such a configuration, the combustion gases directly surround the compaction part. The peak pressures thus attainable are those in the combustion gases themselves. Also the can is directly exposed to hot combustion products, with a consequent conduction of heat to the can and its compacted powder within.

In another isostatic configuration, the compaction powder is contained within a can of suitable shape and material which in turn is surrounded by a liquid or a chemically inert gas at high prefill pressure. The liquid or pressurized gas is in turn pressurized by a piston driven by the combustion gases in the separate combustion chamber. If an intensifier piston configuration is used, i.e. an area ratio multiple from one end to the other, this will allow isostatic compaction to a peak pressure much higher than could be easily obtained by the direct combustion gases themselves. The compressibility of the liquid or gas must be taken into account in this case. In most cases of interest, a liquid would be used since liquids are in general less compressible than gases. In some cases it might be desirable to use solid granular materials instead of a liquid or gas.

Use of Binders and Lubricants

A key feature of this invention is the ability to consolidate materials without the necessity of using binders or lubricants within the powder. All configurations can make use of binders and lubricants, just as for conventional powder metallurgy, if desired, but it is not required for successful consolidation. It is anticipated that there may be many materials and operating parameters for which binders and lubricants may not be necessary. The method of utilizing a series of repeating pulses to reduce property gradients (such as density gradients) may also eliminate the need for binders and lubricants.

Warm Compaction

In all embodiments described above, the compaction chamber, i.e. the die containing the powder, can be warmed to a few hundred degrees Celsius to provide additional process control during compaction. The warm temperature can aid in reducing internal stress buildup during compaction and release, and could thus aid in reducing the cracking often seen in explosive consolidation. The longer time scales for these processes (whether with or without warming the powders) also aid in reducing the cracking problem. Warming is accomplished by the simple addition of electrically heated blankets or by warm water or other fluids flowing through tubing coiled around the chamber.

Pressure Profile Control

In all embodiments of the invention, diaphragms, fast valves and adjustable diameter exhaust ports or orifices can be used to provide additional control of the pressure time history beyond that provided by the gas mix, prefill pressure, and ignition parameters. Diaphragms and valves can be positioned at strategic locations throughout the pressure chamber, and their actuation timed to lower the pressure faster than it would from just heat loss alone through the walls. This provides an additional mechanism for pressure control and for rapidly evacuating the chamber in preparation for the next pressure compacting pulse.

Functional gradients in the compacted parts can be accomplished by tailoring the type of powders and the placement of the powders in the pre-compact die, to allow transition of part makeup from one powder to another with controlled placement of the transition in mixing regions.

The powders can be compacted under multiple repeating pressure pulses, by venting, refilling, and reigniting the gases on a rapid basis. This provides a method by which the compacted part can be relieved of density gradients and internal stresses, and the average part density increased to essentially 100%. How many pulses is required remains to be determined by experiment and further development.

Internal Voids, Cavities, Channels, and Other Non-standard Shapes

Internal voids, cavities, channels, etc. can be placed within the part by locating appropriately shaped fillers inside the powder. The filler material would be chosen so that it could be easily removed after the compaction process is complete either by melting out or perhaps through a chemical etching process. Several simple examples are shown schematically in FIGS. 37–39. These are only simple examples illustrating possibilities. Many configurations are possible.

As an example, nozzles could be manufactured with integral cooling channels embedded within the walls using a single wire cooled around through the powder, and then melted or etched out afterwards.

Multiple Parts Per Shot

It is conceptually straightforward to consider compacting multiple parts during a single compaction event. This is especially true of the isostatic configurations.

Other Configurations

Other configurations utilizing the basic pulsed pressure source using either the combustible gases or the pulsed electric discharges are also possible. The shape and geometry of the part and the compacting "piston" are constrained only by the need to contain the high pressure gases and liquids against leakage. In all cases, active cooling of the hardware will be required to carry away waste heat This can be accomplished using a variety of means, including mainly water cooling lines and channels, and cooling fins with air and/or water flow around the combustion chamber and compaction chamber.

High Tonnage Press

Besides the capability of providing dynamic compaction on short time scales at room temperature to retain advantageous microstructures after the compaction, as described earlier, this invention can provide a means of building small, compact and relatively inexpensive high tonnage presses for conventional pressing operations. Such a device would provide a lower cost alternative to conventional high tonnage presses which are relatively large and expensive.

Densifying Greens

Green compacts made by other processes can further be densified to 100% using the processes described here.

The utility of the present invention is clear from consideration of the previous description and the further descriptions below to one skilled in the art of powder metallurgy.

The benefits of the present inventions in all its different embodiments derive from the very short duration, very high pressure pulses which can be generated, and the "pseudo-hydrostatic" nature of the resulting pressure. In forming applications, this translates to increased formability, expanded geometry choices, and a wide range of operating temperatures, pressures, and atmospheres. In powder consolidation, the benefits include higher green density, high aspect ratio compacts, and an expanded range of operating temperature, pressure, and atmosphere when compared to die pressing. The invention can be adapted to an industrial scale and will be a low cost technique with high rates of yield for P/M part manufacturing.

The pulsed powder compaction method and apparatus as described here and in the ongoing descriptions to follow provide the following advantages in powder metallurgy applications:

Controllable compaction pressures to about 500 kpsi can ultimately be generated in repetitive systems and are adjustable from a low value to a maximum by varying the gas fill parameters and choice of intensifier ratio.

Magnitude of the pressure, duration of pulse, and powder temperature can be varied as process parameters to achieve the required microstructure, homogeneity, and density in a consolidation.

Peak pressure durations are short (100's of $\mu$s to a few ms) thus allowing high rep-rate operations for powder consolidation in a potential industrial or commercial application. The production rate limiting factor is expected to be the time required to insert powders into the die and subsequent removal of the consolidated part afterwards.

For a typical production or fabrication cycle, a rapid sequence of pulses can be imparted without interruption in a short time and the pressures continuously adjusted by varying the gas mixture ratio $\epsilon$ and prefill pressures. CDDC is expected to be a highly reproducible process, readily adapted to a manufacturing environment.

Powder consolidations can be done either at room temperature or warm temperature under controlled atmosphere.

Net shape fabrication of desired simple shapes (foils, discs, plates, tubes, rods, bars, hexagonal rods, etc.) and complex shapes can be performed by design of appropriate die and other components.

Powder densification close to theoretical densities can be achieved in various material systems including metallic, intermetallic, and ceramic systems. Thus, the invention offers enhanced densification of potentially high aspect ratio parts in a simple, single press process.

Consolidation of powders can be performed with or without binders or lubricants, thus eliminating the need to remove those binders and lubricants in a further processing step prior to sintering.

CDDC is a primarily all gas consolidating system with low capital, operating, and maintenance costs compared to purely mechanical systems. High production rates and quasi-continuous nature of operation will result in cost reduction of the product.

CDDC systems will be relatively small in size and occupy less space compared to equivalent hydrostatic presses or flywheel mechanical systems.

Very high consolidation forces can be generated with a small, low cost system; resulting in high densification which will prove beneficial by lowering sintering temperatures, yielding higher strength and finer microstructures.

The consolidation forces can be applied with great precision both in time and space; permitting tailoring of the pressure distributions and efficient energy usage.

Higher green density compacts are obtained, with higher strength, usually in a single pressure pulse, than obtained with conventional presses, and parts have higher elongation.

CDDC reduces "over-pressing" cracks at high loads, thus overcoming a common problem of conventional presses.

Die life may be high even at relatively high loads due to the short time duration of the pressure.

Large compacts can be formed.

EDDC and ETDC accrue similar benefits by simple adjustment of stored electrical energy, pulse shaping through the PFN structure, and elimination of combustible gases for those environments where combustible gases cannot be allowed.

This technology can be developed as a cost effective, ultrafast consolidation technique to produce P/M components on an industrial scale. It is expected that the invention can provide a new processing technique that will provide safe, reliable, lightweight, and less expensive components for commercial, aerospace, and military markets. This technology will be transferable to consolidation of metallic, intermetallic, ceramic, and composite metal-ceramic materials for magnetic, electronic, and structural applications in many industries.

These and further and other objects and features of the invention are apparent in the disclosure, which includes the above and ongoing written specification, with the claims and the drawings. Still other objects and advantages of the present invention will become readily apparent to those skilled in the art from the following detailed description, wherein only the preferred embodiment of this invention is disclosed in detail simply by way of illustration of the best mode contemplated for carrying out the invention. As will be appreciated, this invention is amenable to other and different embodiments, and its several details are capable of modification in various obvious respects, all without departing from the invention. Accordingly, the drawings and descriptions are to be regarded as illustrative and not restrictive in nature.

DETAILED DESCRIPTION OF THE PREFERRED EMBODIMENTS

Figure 1:
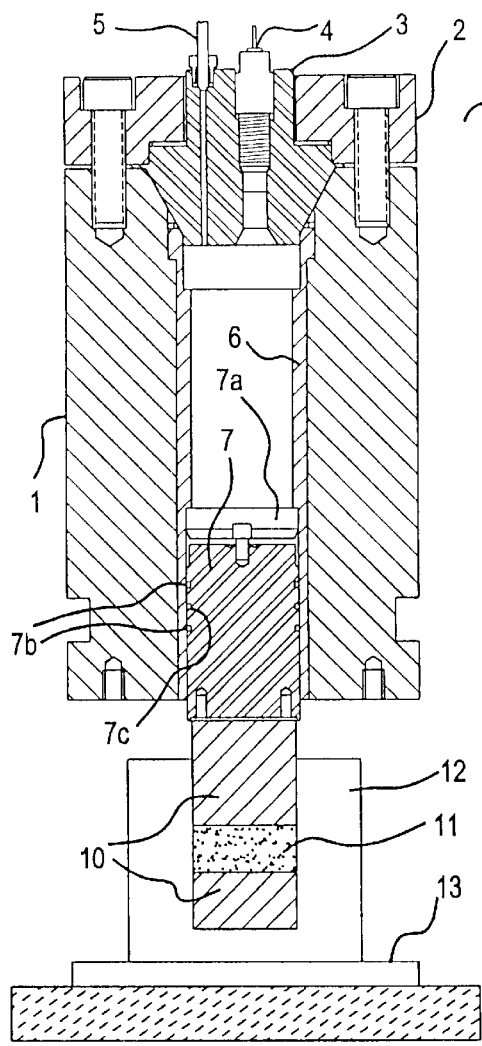
FIG. 1 shows the major components of a typical Combustion Driven Dynamic Consolidation (CDDC) Device.

Reference is now made to FIG. 1. In the most preferred embodiment of the invention, the basic dynamic powder consolidation device includes a main combustion chamber 1 sealed at one end (top) with an end cap 2 and a chamber plug 3 which are held in place by multiple bolts. The chamber plug incorporates ports for an ignition device 4 (to be described later), gas fill 5, and gas vent (not shown). The plug may also contain other devices such as pressure gages or thermocouples (not shown). The combustion chamber is equipped with a stainless steel liner 6 to reduce wear and heat damage to the main chamber 1. At the opposite end of the chamber is a compaction ram 7 that acts as a moving sealed piston and ram, to compact the powder.

The compaction ram 7 incorporates several static o-ring type and several dynamic piston rings seals 7b and 7c to seal both the initial fuel gas and the pressure induced during its combustion. In addition, a dynamic Bridgman type seal 7a typically made from 316 Stainless Steel is used at the back end or combustion side of the ram. This seal is fashioned after similar seals used in gun projectiles to seal combustion gases dynamically. However, unlike one-use projectile seals, this seal operates repeatedly. This combination of static and dynamic seals can seal the combustion chamber under its various operating conditions at pressures ranging from 1 to 100 kpsi.

The ram being exposed to the combustion gases at one end is typically made from similar materials as the combustion chamber itself (i.e. 4340 alloy steel). The chamber 1 and plug 3 are typically constructed from a high strength steel alloy such as 4340 while the liner 6 is typically made from a stainless steel alloy such as 17-4 PH. The volume of the chamber is sized to deliver a set force from the ram at a defined chamber pressure. For example, if 300,000 pounds of force are to be delivered to a ram having an effective area of 12.5 square inches, the pressure inside the chamber must reach 24,000 psi or 300,000/12.5. As the ram moves, the pressure in the chamber should always meet or slightly exceed this value. To ensure this occurs the chamber should be large enough that the change in volume caused by the ram motion, and subsequent powder compaction, does not cause the chamber pressure to drop below the desired value. In most cases, a ratio of chamber volume to ram drive volume of 10 to 1 is sufficient. Therefore, the design chamber volume is based upon the ram peak load, ram area (diameter), and peak chamber operating pressure set by the user as well as the expected travel of the ram during compaction. Generating the desired combustion pressure inside the chamber is dependent of the parameters of the fuel gases as described later.

In operation the powder 11 to be compacted is loaded into a die 12 located on a table directly under the ram 7. A combustible gas mixture is then is fed into the chamber through the fill port 5. Typical gas mixtures used include but are not limited to, methane (or natural gas) and air, methane-oxygen-helium, methane-oxygen, hydrogen-air, hydrogen-oxygen-helium, and hydrogen-oxygen. Other gas mixtures include propane-air, acetylene-air, ethylene-air, and ethane-air. The preferred mixture for operation due both to it availability, and high vapor pressure is methane-air or natural gas (mostly methane) and air. Although many fuel-air ratios can be used in the process, typically the mixture fuel-air (oxidizer) ratio is one. A fuel-oxidizer ratio of one provides the maximum amount of chemical energy for a given amount of products. Different constituent mixtures (e.g. methane-air or hydrogen-air) provide the same peak combustion pressure provided the differences in their respective heat of combustions is accounted for in the total amount of fuel used. The rate at which the energy is delivered to the ram is however dependent on the mixtures composition. For example at the same delivered ram pressure hydrogen-air mixtures will reach peak pressure nearly ten times faster than methane-air mixtures. The final time to reach peak pressure is dependent on the mixture, the number of ignition sites, and the geometry and volume of the combustion chamber. In testing to-date rise times from 2 to 400 ms have been obtained. In normal combustion, peak chamber pressures range from 20 to 65 kpsi. Although higher pressures are possible it is generally desirable to run the device at the lowest pressure consistent with the desired ram load as this prolongs the chamber fatigue life.

Figure 2:
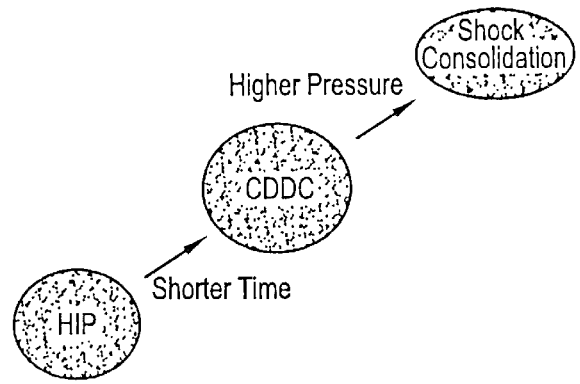
FIG. 2 compares The CDDC process to other compaction processes.

The chamber is typically operated such that combustion and not detonation of the reactants is obtained. FIG. 2 illustrates that the present invention 15 usually operates in an intermediate regime between slow, low pressure HIP consolidation 17, and the even faster, higher pressure pure shock consolidation regime 19. Operation in detonation mode (with induced shocks) is however, not only feasible, but potentially useful for some applications. Mixtures with low diluent levels relative to their oxidizer (e.g., oxygen/nitrogen for air mixtures) can be detonated under the proper conditions in the chamber. Detonations are extremely rapid compared to deflagrations in a combustible gas mixture and can be used to decrease compaction time of some powders to sub milliseconds levels. Although detonations are typically avoided because they tend to increase local pressures levels dramatically they can be used if the device is designed for such use.

Regardless of the mixture or mode of energy release used, the gases are provided either directly from standard gas supply bottles or natural gas feed lines. In the case of air, the high-pressure supply (up to 10,000 psi) can be provided directly from the ambient atmosphere through a series of compressor stages.

Figure 3:
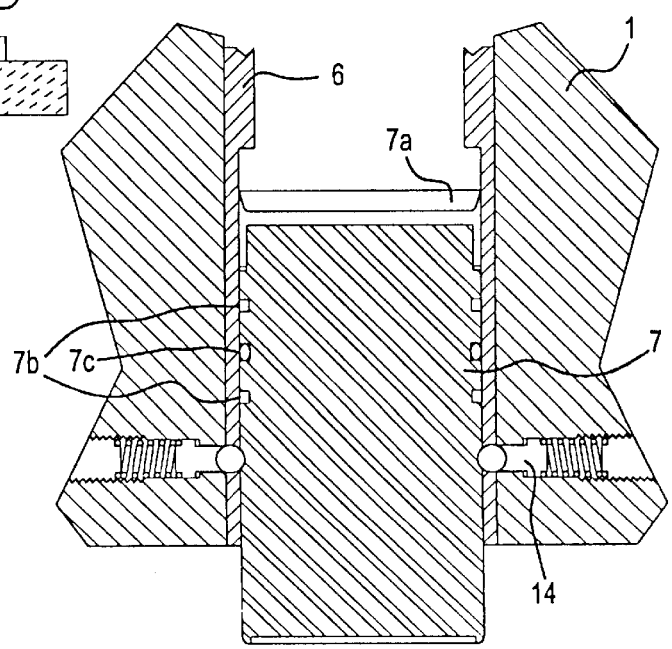
FIG. 3 shows the detent method of retaining the compaction ram until a pre-set pressure is obtained.
Figure 7:
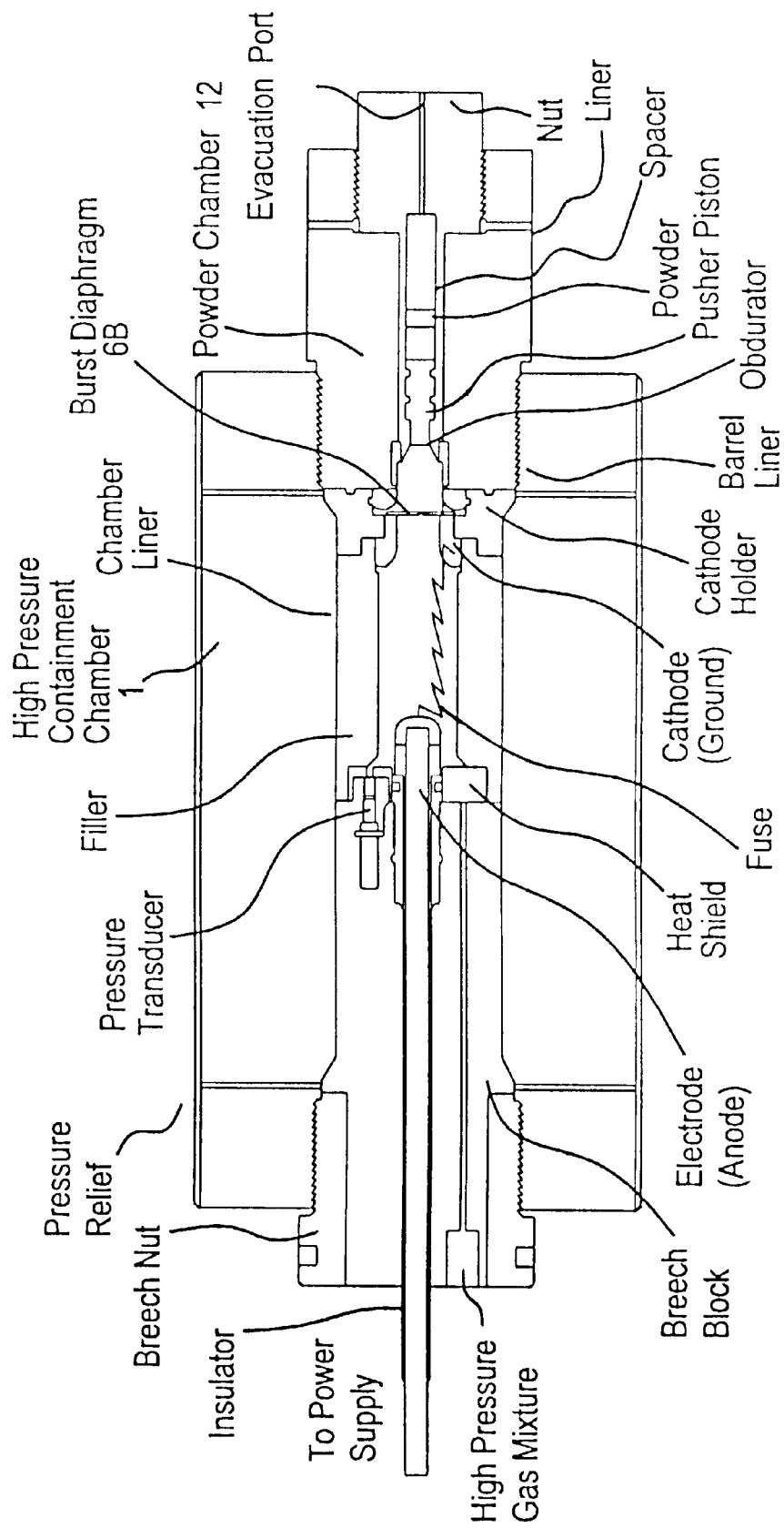
FIG. 7 reveals details of a CDDC device incorporating a diaphragm and delivering 16 tons of force.

In early configurations of the present invention, a diaphragm 6B (as shown in FIG. 7) was used to separate the combustible gases from the ram 7 and compaction powders 11. In the diaphragm configuration, the diaphragm is typically made from a high strength steel alloy such as Inconel, is designed to open at a pressure well above the fill pressure but below the expected combustion pressure. When this design failure pressure is achieved the diaphragm opens in a controlled manner at pre-defined scribe marks exposing the ram to the combustion pressure and pressing the powder. In later configurations of the device the diaphragm is removed and the sealing function is taken over by the ram itself as previously described. As shown in FIG. 3 an alternate design incorporates cams or detents 14a to hold the ram in place during the filling process. After ignition and at a pre-defined point during the combustion the cams or detents release the ram allowing it to move into the compaction die punch. Bolts press springs to move balls into grooves in the piston 7.

With the diaphragm free design in FIG. 1, as the chamber 1 is pressurized with the fuel gas the ram 7 is pressed against the part die 10 with a pressure equal to the final chamber fill pressure multiplied by the area of the ram 7. This pre-load on the die and powder is a unique feature of the device that allows the powder to be partially compacted before the fuel gas is ignited and the main compaction load is induced. This preload also removes entrapped air in the powder. At a pre-determined gas fill pressure the fill port is closed using a high-pressure valve (not shown). A high voltage is then transmitted to the igniter 4 causing an electrical arc to occur at the tip of the igniter 4.

The ignition stimulus provided by the igniter 4 can be delivered by several means. A surface discharge design utilizes an inert surface between the positive and negative electrodes to conduct the arc at relatively low voltage independent of the pressure of the surrounding gas. In a gap discharge design the arc must be made between the electrodes through an air gap that is actually composed of high-pressure fuel gases (e.g. methane-air). This design requires a higher initial breakdown voltage than the surface discharge approach. Another ignition concept involves the use of an exploding wire. In this approach a thin conductive wire is attach to both the positive and negative electrodes. Upon receiving sufficient current the wire quickly vaporizes creating an arc path between the electrodes. Regardless of the arc ignition scheme the energy delivery system is composed of a high voltage coil and/or capacitor triggered by a signal from the user or computer under the users control. In some cases it is desirable to use multiple igniters either to provide redundancy in the ignition process and/or to reduce the time it takes to ignite the mixture. For example two igniters both located at the top of the chamber would provide some ignition redundancy in the system but little increase in combustion speed as the ignition waves prorogates and quickly merge into one single combustion wave front. If the igniters were however located at opposite ends of the chamber and energized simultaneously the time to complete the combustion would be decrease by a factor of two as two distinct combustion waves traveling from separate sided of the chamber consume the fuel entirely before merging at the center of the chamber. The number and location of igniters is then dependent on the geometry of the chamber, the speed of combustion desired, and the need for redundancy to ensure 100 percent ignition reliability. To date only one igniter has been used, however it is very likely that final designs particularly larger ones will incorporate multiple ignition sites.

Once ignited, a combustion wave will propagate from the ignition point outwards to all regions of the combustion chamber 1. The resultant pressure rise during this combustion will cause the ram 7 to press down further on the compaction punch 10 with a force dependent on the final combustion pressure times the area of the ram. The powders, 11 encased in the die 12 and compacted rapidly at room temperature. The die 12 can incorporate heating elements if warm powder compaction is desired. When designed with an appropriately large internal volume combustion chamber 1 the force applied by the ram is relatively constant independent of stroke length. Current mechanical or hydraulic presses have wide variances in stroke length versus ram load. Load cells 13 located under the die measure the load applied.

Figure 4:
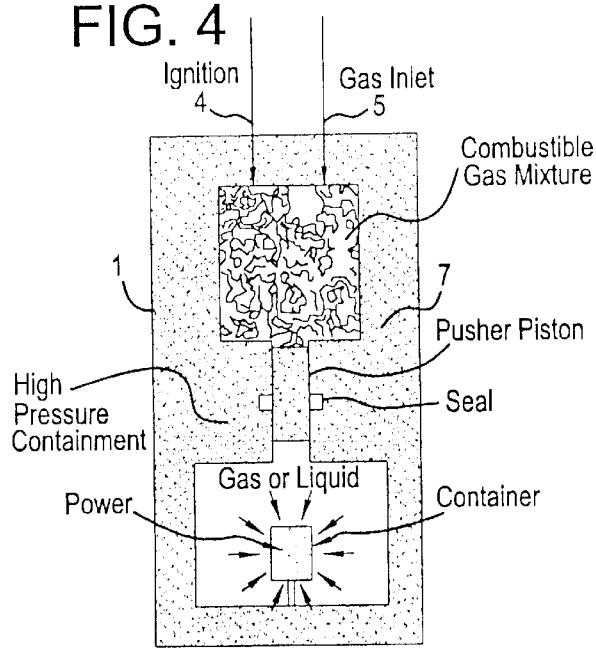
FIG. 4 shows an arrangement for isostatic compression of powders using the CDDC process.

In another embodiment, as illustrated in FIG. 4, the die is replaced by a fluid filled chamber in which a powder sample 11 is placed after being encapsulated in a flexible mold 24. The ram 7 then compresses the suspension fluid (e.g., water), which in turn uniformly hydrostatically compacts the powder sample.

The ram can be composed of multiple parts designed to applied different loads to the compact. In this concept a series of nested or segmented rams can be used to simultaneously apply varying loads to multiple parts of the compact simulating to some degree multiple platen and ram operations performed in current conventional presses.

Figure 5:
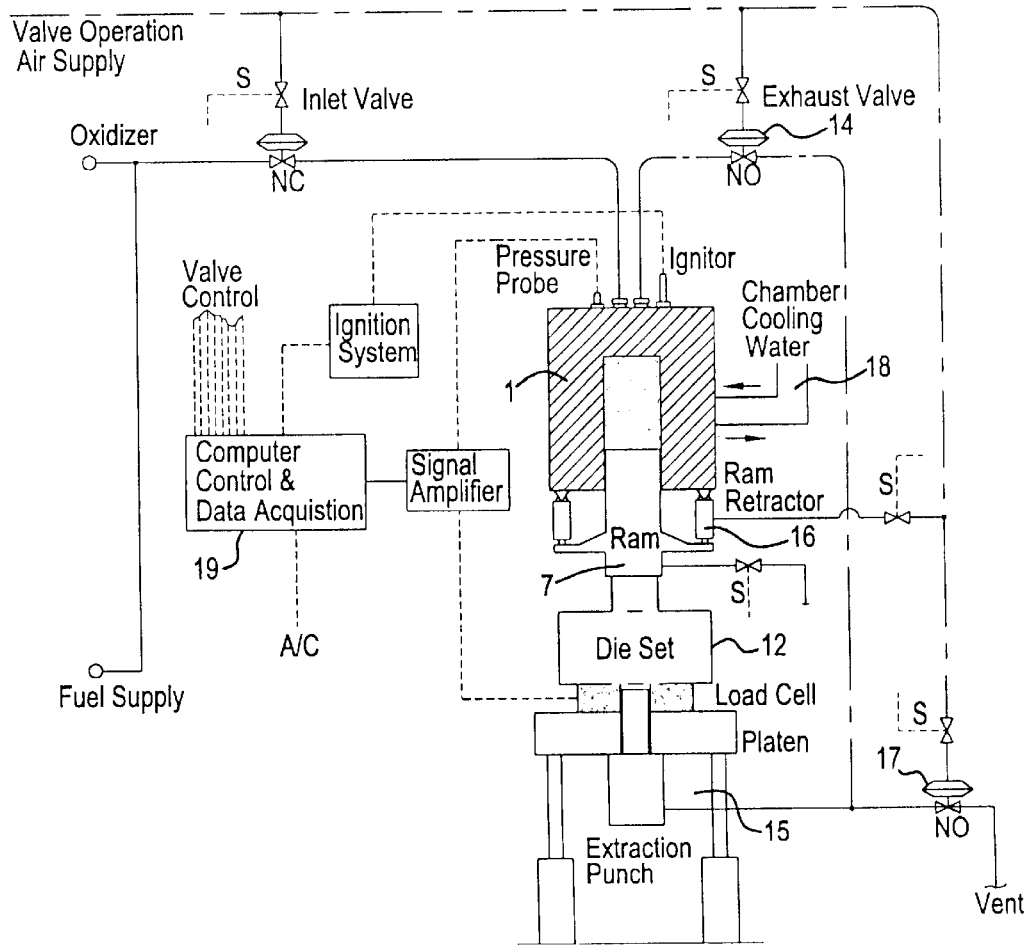
FIG. 5 shows additional features of a typical CDDC device including valve and process control, ram retraction, and part extraction.

Reference is now made to FIG. 5. After the ram 7 has reached full extension an exhaust valve 14 is opened releasing the backpressure on the ram and porting the gas to the compact extractor 15. The ability to utilize the pressurized exhaust gas to extract the compacted part from the die is an additional unique feature of the device. Current presses require a separate mechanism and energy source to extract the compacted part. As the combustion gases are exhausted the ram is retracted to its original position by spring or hydraulic retractors 16 attached to the ram. After the combustion products have been vented through the final vent valve 17, valves 14 and 17 are closed, the die 12 is refilled with powder, and the entire process can be repeated. At a sufficiently high rate of production waste heat build-up will become a problem and is addressed by the incorporation of a cooling jacket 18 installed in and around the combustion chamber 1. A computer controlled operating system 19 set-ups, controls, and sequences all operations based on initial user input. For some applications such as materials research the device can be operated in single shot mode which substantially reduces the amount of supporting hardware required (cooling, automatic powder filling, etc.).

Figure 6:
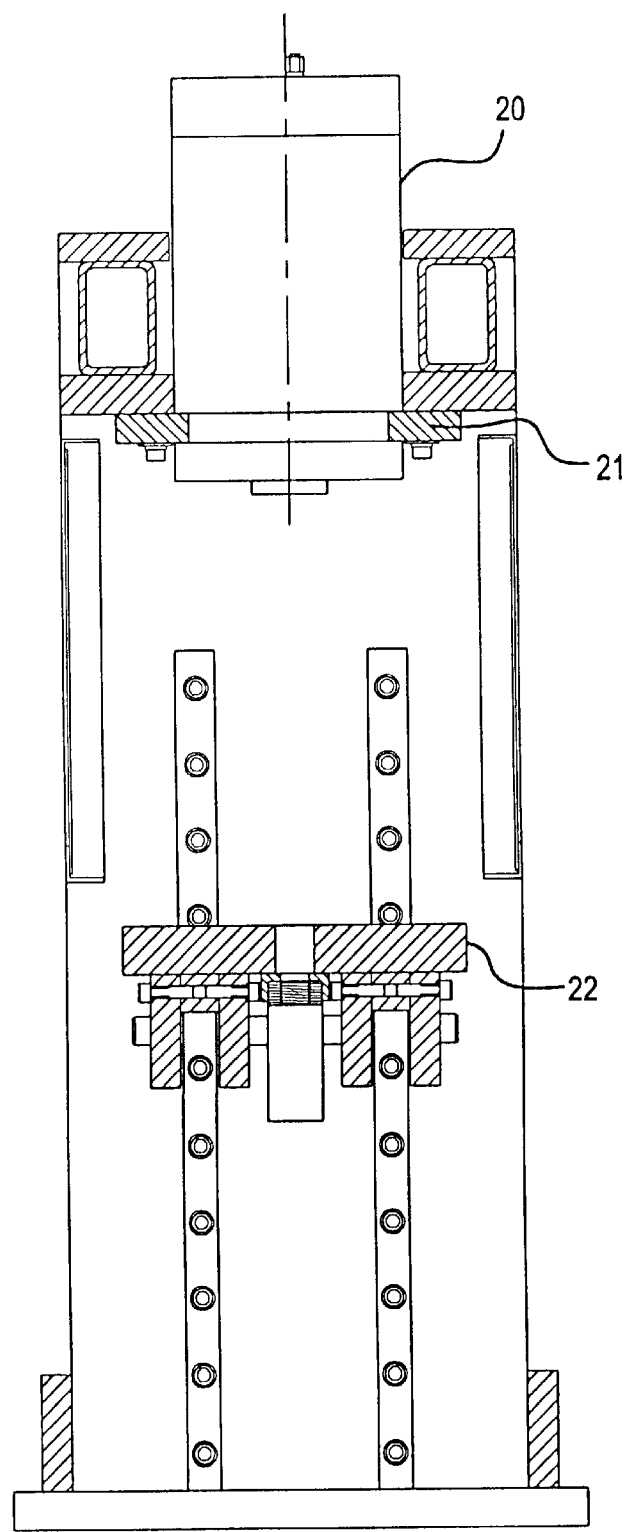
FIG. 6 is a side view of CDDC mounting and frame hardware for vertical orientation use.

Reference is now made to FIG. 6. The above referenced features are incorporated into and supported by a steel frame composed of heavy welded frame members. The frame supports the compaction chamber 20 itself with flanges installed around the chamber 21. The frame has provisions for an adjustable table to support the die under the chamber ram 22.

We now teach by example four specific implementations of the invention at different tonnage levels. Experimental results obtained during testing of the first three implementations are described showing the development of the combustion device and its performance capability. A fourth example teaches the projected parameters for a much larger tonnage press. These examples are presented as representative illustrations of actual compaction devices. Many other sizes and variations to the design will be apparent to one skilled in the art.

Example 1—16 Ton Press

In initial testing, we completed successful demonstration of the CDDC concept, using the nominal 16-ton device shown in FIG. 7. With this device, we demonstrated consolidation of Al powders (average particle size of 50 to 60 $\mu$m) to 97.6% theoretical density. Based on scanning electron microscopy, we found that following powder rearrangement and sliding, plastic deformation resulted in increased contact between the Al powders and in cold welding. The plastic deformation and cold welding contributes to development of the interparticle bonds. The rapid consolidation technique also breaks up the surface oxides and produces local melting at the interparticle contacts giving good interparticle bonding. The compacts were 1.5 cm in diameter and 1 cm long. The total energy used for consolidation in these initial experiments was 133–304 kJ and the resultant peak pressure was in the range 23–47 kpsi. The consolidation was performed at room temperature. The 97.6% theoretical density is for the as consolidated compact (at a single pulse pressure of 47 kpsi with an approximate pulse width of 1 millisecond) without any post consolidation sintering. These results were very encouraging for an initial effort when compared to what is typically achieved in conventional press and sinter processing. Typically, by conventional pressing and sintering only, Al alloy parts of about 80% theoretical density can be produced, and by repressing, over 90% theoretical density can be obtained. On the other hand, the present invention achieved 97.6% theoretical density in a single room temperature process step by our dynamic consolidation technique. Although this initial prototype device had the capability to go up to about 90 kpsi peak chamber pressures and, with some modifications, to consolidate at warm temperatures, experimental work with this device ended before attempting those conditions. We expect the ultimate chamber pressure capability of such a device to be in the range 200–500 kpsi using presently available materials. Future improvements in materials might raise that limit even further.

Initial demonstration of the CDDC concept was accomplished using a small 16-ton rated press (FIG. 7). Using this device, we demonstrated consolidation of Al powders (average particle size of 50 to 60 $\mu$m) to 97.6% theoretical density. These early experiments utilized a high pressure combustible gas mix composed of $He+CH_4+2O_2$ at room temperature. In this initial design a diaphragm was used to seal the combustible gases prior to ignition. During the combustion cycle this diaphragm was designed to burst at a fixed design pressure causing the ram to be compressed into the powder.

Experimental Results

Figure 8:
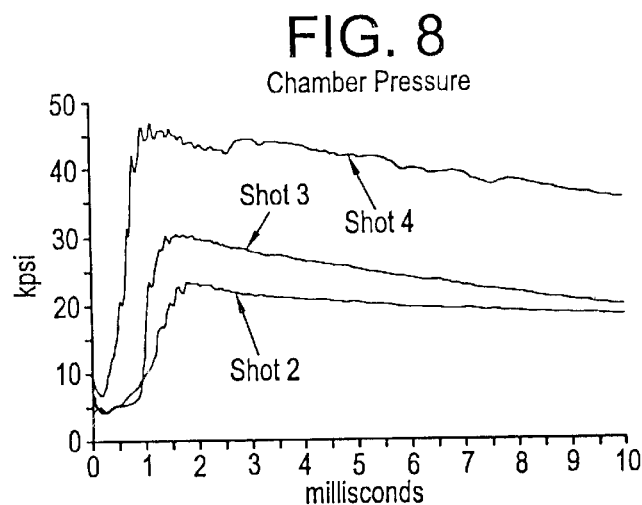
FIG. 8 shows typical combustion derived pressure versus time curves for the 16-ton CDDC device.

During the initial effort, we performed four experiments. The starting powder for all experiments was Al (AMPAL 611) procured from Ampal, Inc., Flemington, N.J. AMPAL 611 is an atomized Al powder and is similar to wrought Al alloy 1021. The characteristics of the AMPAL 611 starting Al powders are listed in Table 1. The experimental parameters for the four shots are listed in Table 2. For Shot #2 a 1.5 wt % solid lubricant (Acrawax C-Ethylene Bissteara-mide; atomized; average particle diameter of 6 μm) was used. Acrawax C is a standard solid lubricant and binder used for cold compaction of P/M parts including Al. We procured this from Lonza Speciality Chemicals, Fair Lawn, N.J. For all shots with or without the solid lubricant, the powder charge was blended by rotating them in a cylindrical container at 200 rpm (based on the formula $N_0=32/d^{0.5}$, where $N_0$ is the rotation speed in rpm and d is the cylinder diameter in meters). Shot #1 resulted in only 9-kpsi pressure, which was not sufficient to break the diaphragm. The subsequent Shots #2 to 4 resulted in consolidation of the Al powders and the characteristics of these compacts are discussed in the following section. FIG. 8 shows the pressure trace for Shot #2, 3, and 4. It is seen that the peak pressure of 23 to 47 kpsi was applied in 1.0 to 1.8 ms time scale, thus being a dynamic consolidation process. For all shots, ignition was achieved by using a 4 kJ electrical energy. All shots were performed with the starting Al powder at room temperature.

The consolidated Al compacts were analyzed for determining the green density and examining the microstructures using scanning electron microscopy (SEM).

Figure 9:
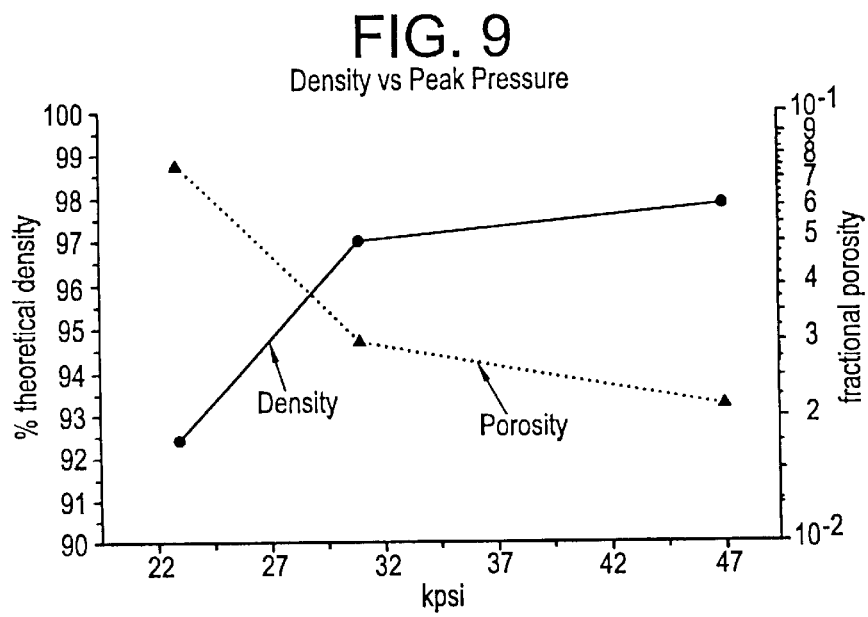
FIG. 9 plots CDDC load pressures versus density of the compacted powder.
Figure 10A:
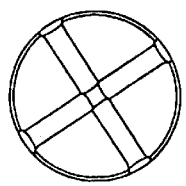
FIG. 10 shows a compacted metal powder part formed in the 16-ton CDDC press.
Figure 10B:
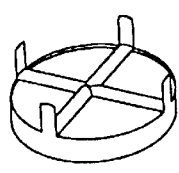
Figure 10C:
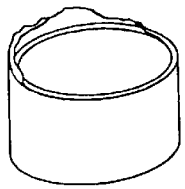
Figure 10D:
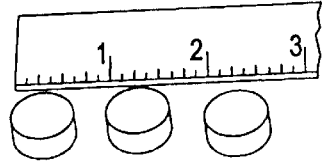
Figure 11:
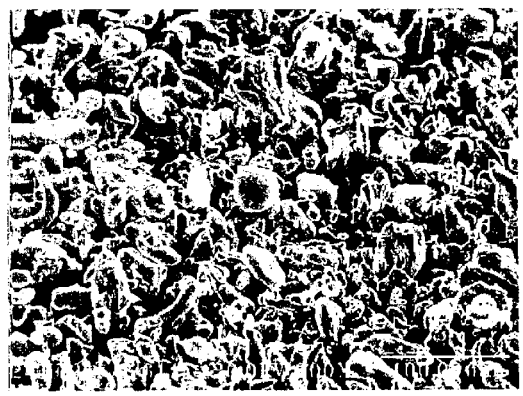
FIG. 11 shows 200×magnification of starting Al powder (before compaction).
Figure 12:
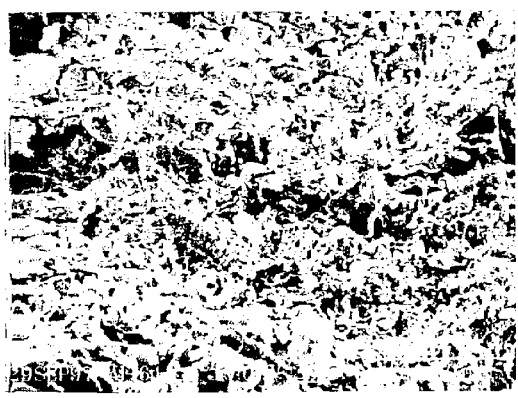
FIG. 12 shows 200×magnification of fractured surface of compacted Al powder formed in the 16-ton press operating at 23-kpsi combustion pressure.
Figure 13:
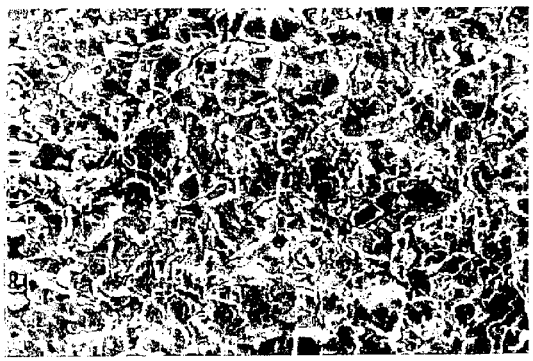
FIG. 13 shows 200×magnification of fractured surface of compacted Al Powder formed in the 16-ton press operating at 31-kpsi combustion pressure.
Figure 14:
FIG. 14 shows 200×magnification of fractured surface of compacted Al powder formed in the 16-ton press operating at 47-kpsi combustion pressure.
Figure 15:
FIG. 15 shows 1000×magnification of starting Al powder (before compaction).
Figure 16:
FIG. 16 shows 1000×magnification of fractured surface of compacted Al powder formed in the 16-ton press operating at 23-kpsi combustion pressure.
Figure 17:
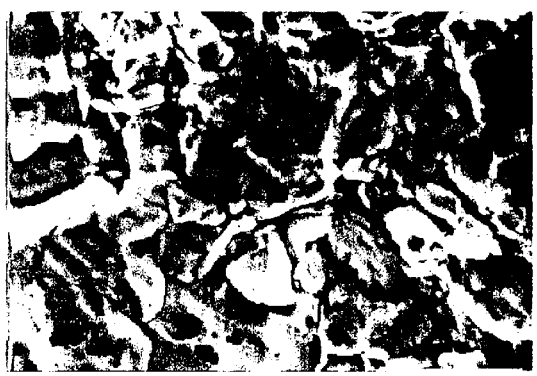
FIG. 17 shows 1000×magnification of fractured surface of compacted Al powder formed in the 16-ton press operating at 31-kpsi combustion pressure.
Figure 18:
FIG. 18 shows 1000×magnification of fractured surface of compacted Al powder formed in the 16-ton press operating at 47-kpsi combustion pressure.

The theoretical density that we obtained for the Al compacts were 92.44%, 97.01%, and 97.56% for the applied dynamic pressures of 23, 31, and 47 kpsi respectively. These results are plotted in FIG. 9 in terms of both fractional porosity (log scale) and theoretical density of the compacts versus applied pressure. The consolidation was performed at room temperature at a single pulse pressure without any post consolidation sintering. These results are very encouraging for a Phase I effort when compared to what is typically achieved in conventional press and sinter processing. Typically, by pressing and sintering only, Al alloy parts of over 80% theoretical density can be produced and by repressing over 90% theoretical density can be obtained. We have achieved about 97.6% theoretical density in a single room temperature process step (a single pulse pressure of 47 kpsi with a pulse width of 1 millisecond) by our dynamic consolidation technique. The device has capability to go up to about 90 kpsi pressures and, with some modifications, to consolidate at high temperatures. We expect the ultimate capability of such a device to be up to 200 kpsi pressures. At these high pressures full density (100% theoretical density) is expected.

SEM Examinations

FIG. 10 shows the macrographs of the as consolidated Al compacts. These compacts were 1.5 cm in diameter and about 1 cm long. The detail of the perpendicular grooves of the die surface is replicated on the compact surface. This indicates that CDCC has the capability to produce net shape intricate and complex parts with appropriate die design. SEM was used to examine both the fracture surfaces and the unpolished as consolidated surfaces of the compacts. FIGS. 11 to 18 shows the SEN micrographs of the starting Al powder and the fracture surfaces of the compacts for Shot #2 to 4. FIGS. 11 to 14 are at 200×magnification and FIGS. 15 to 18 are the same area at 1000×magnification. By comparing these micrographs at a given magnification, it is seen that as the applied pressure is increased the porosity is decreased and contacts between the Al powders is increased. This results in the increased theoretical density of the Al compacts with increasing applied pressure as discussed earlier. It is seen from these micrographs that following powder rearrangement and sliding, plastic deformation has resulted in increased contact between the Al powders and in cold welding. The plastic deformation and cold welding contributes to development of the interparticle bonds. The rapid consolidation technique also breaks up the surface oxides and produces local melting at the interparticle contacts giving good interparticle bonding.

The total energy used for consolidation ranged from 133 to 304 kJ with resultant pressure from 23 to 47 kpsi. The consolidation was performed at room temperature. The 97.6% theoretical density is for the as consolidated compact (at a single pulse pressure of 47 kpsi with a pulse width of 1 millisecond) without any post consolidation sintering. These results are very encouraging for this preliminary proof-of-concept effort when compared to what is typically achieved in conventional press and sinter processing. Typically, by pressing and sintering only, Al alloy parts of over 80% theoretical density can be produced and by repressing over 90% theoretical density can be obtained. We have achieved 97.6% theoretical density in a single room temperature process step by our dynamic consolidation technique. Three point bend test results indicate the fracture stress of this compact to be 11.34 ksi. (The typical tensile strength of unalloyed wrought Al alloys in an annealed condition is 10 ksi.). The existing device has capability to go up to about 90 kpsi pressures and, with some modifications, to consolidate at high temperatures. We expect the ultimate capability of such a device to be above 200 kpsi pressures.

Example 2—30 Ton Press

Figure 19:
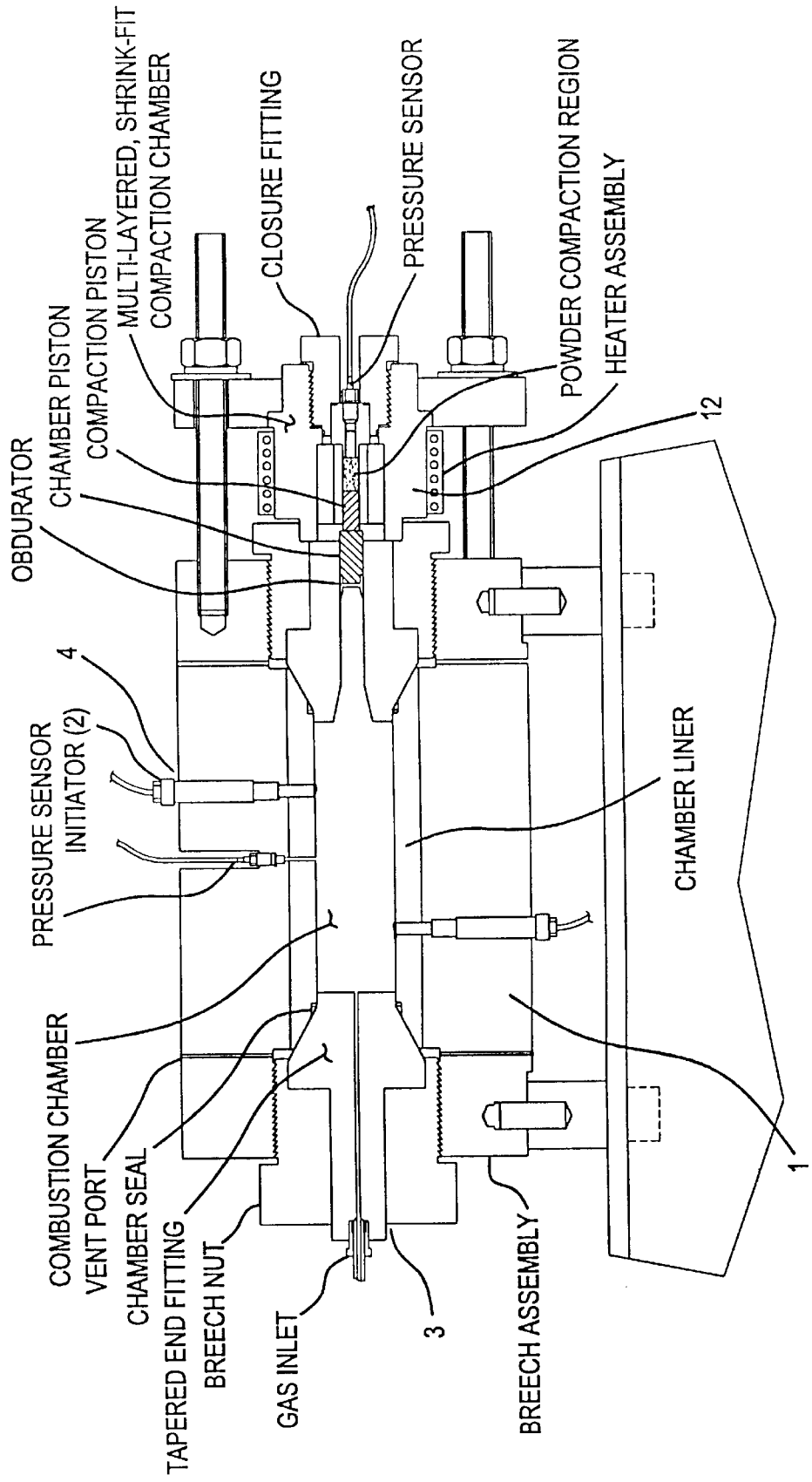
FIG. 19 shows details of the 30-ton CDDC device.
Figure 20A:
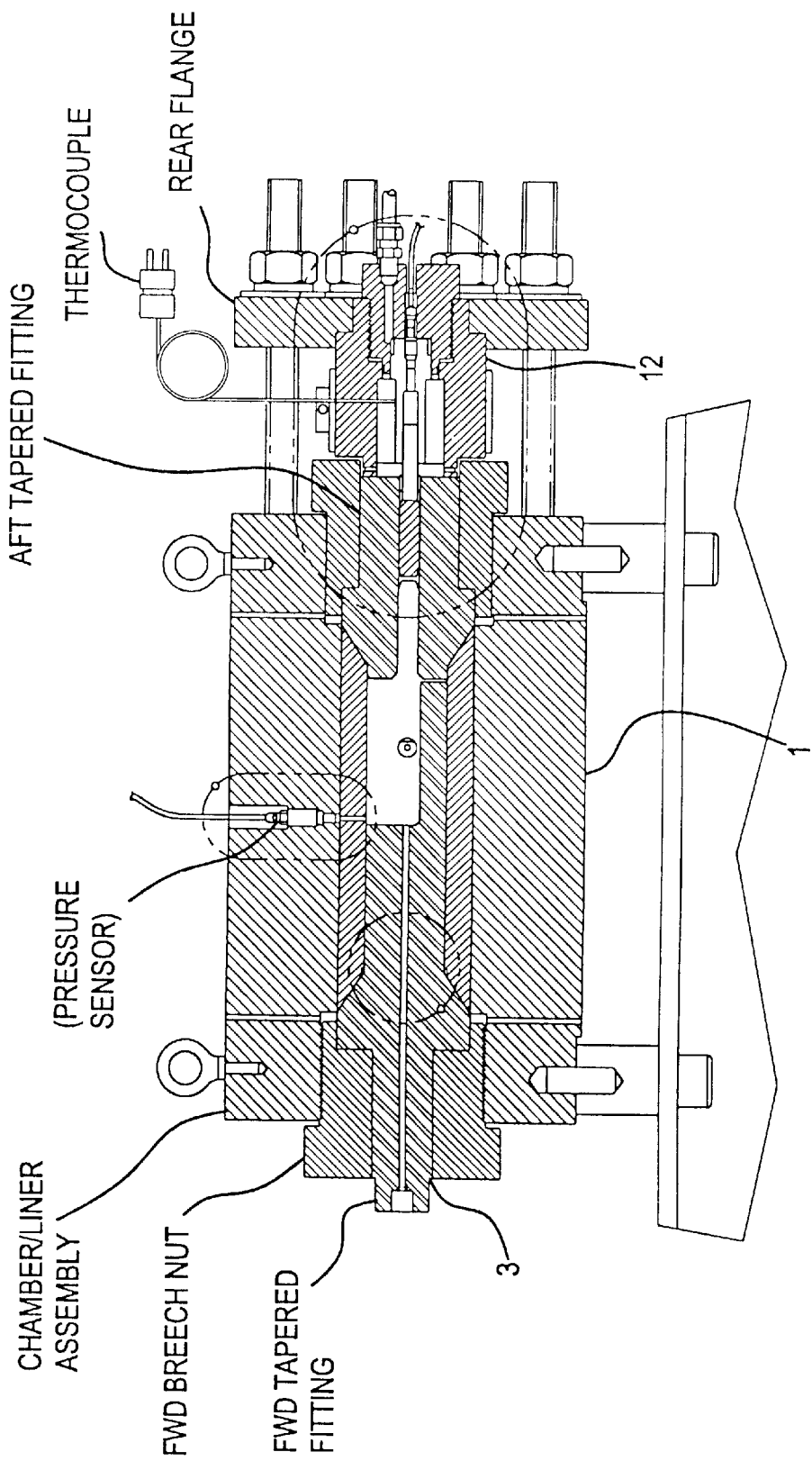
FIGS. 20a–d shows various details of the 30-ton CDDC device and associated components.
Figure 20B:
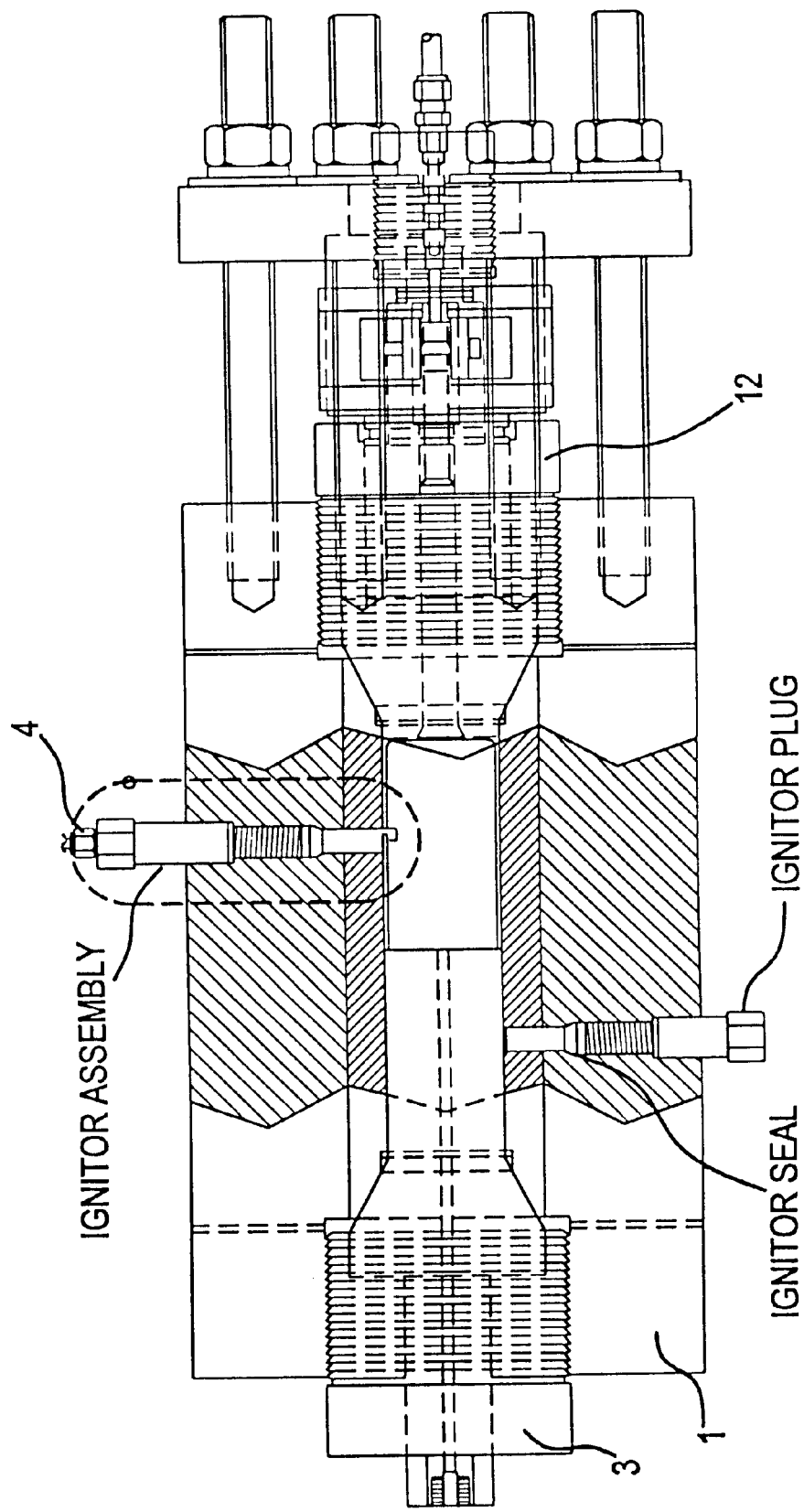
Figure 20C:
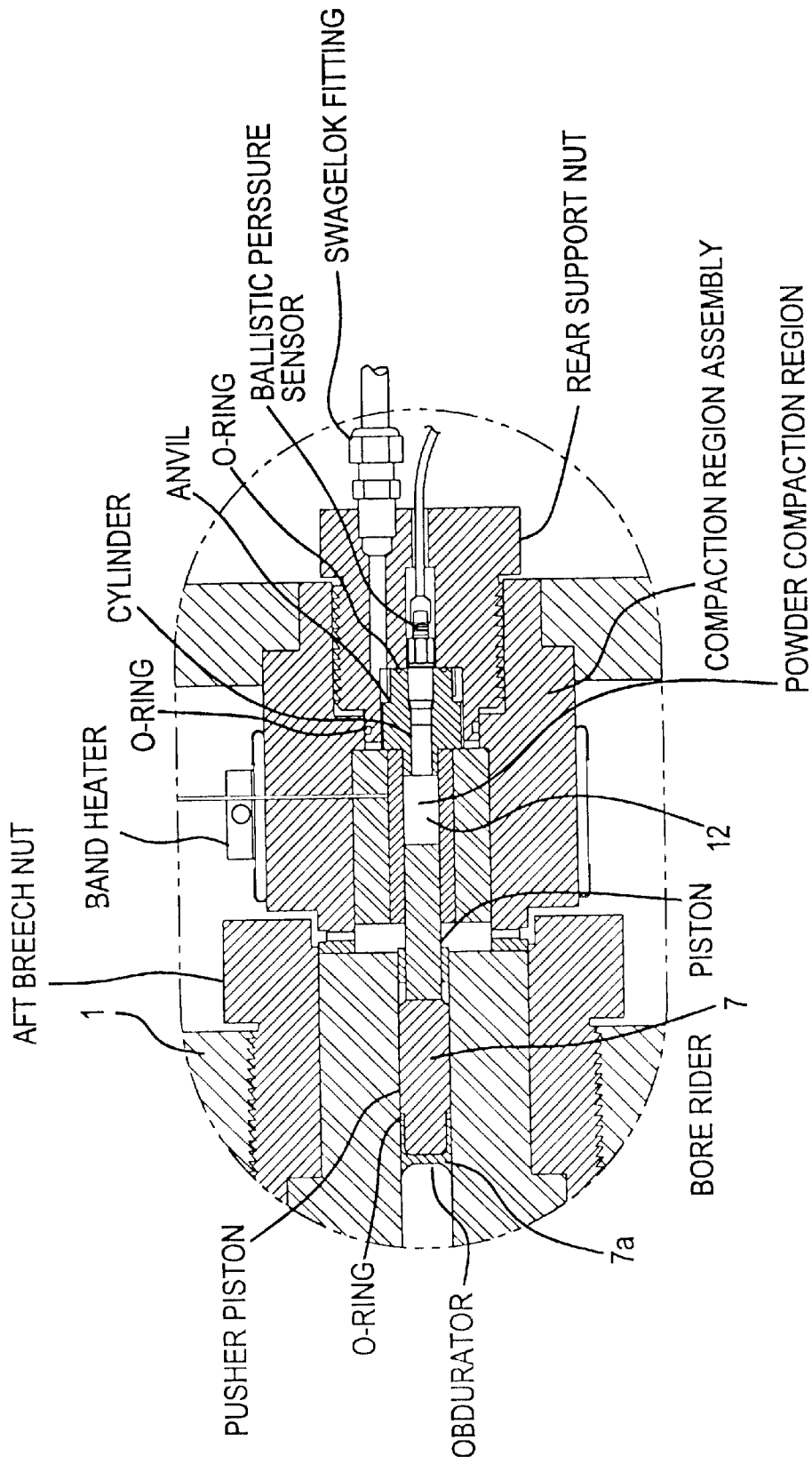
Figure 20D:
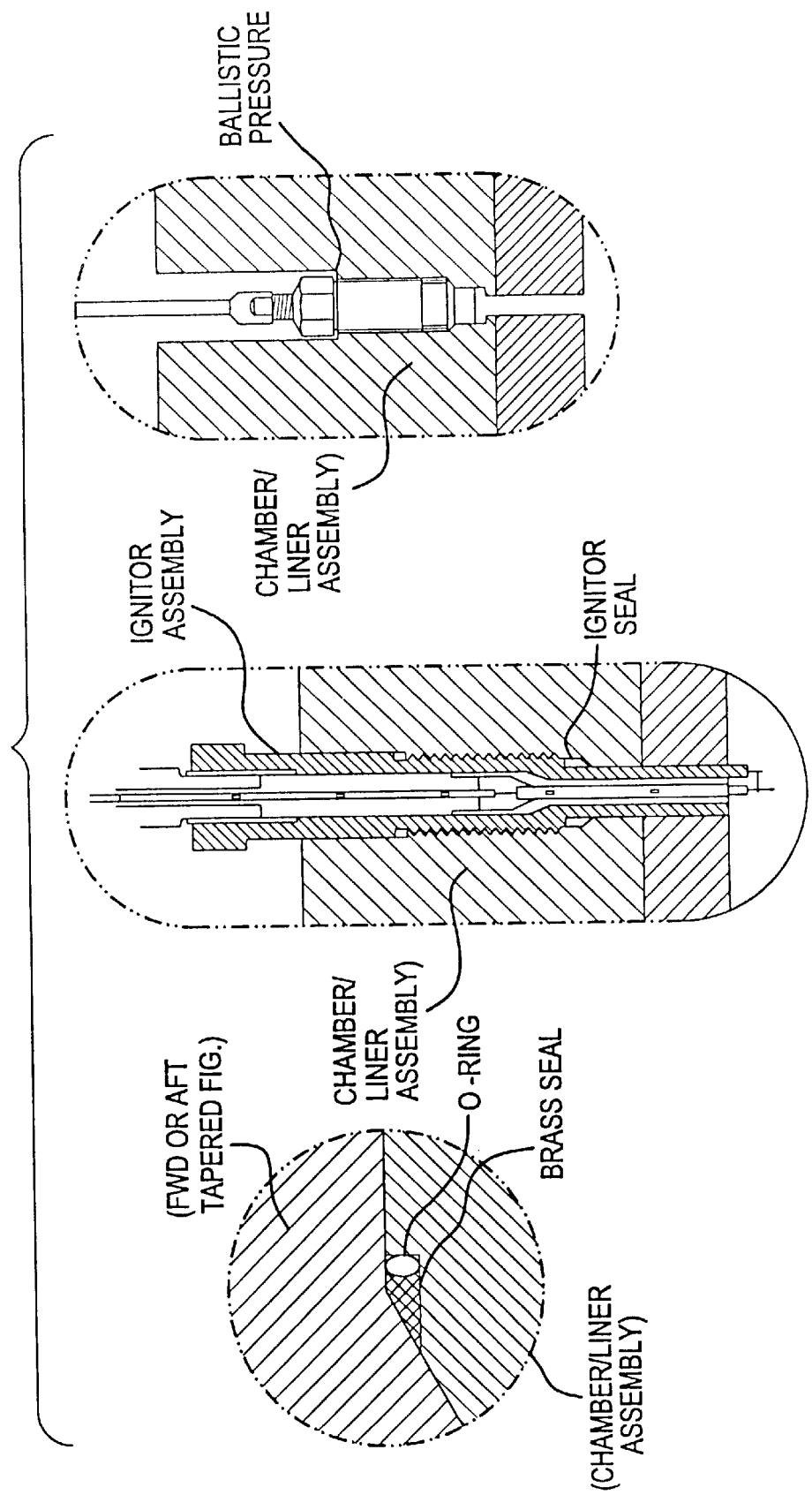
Figure 21A:
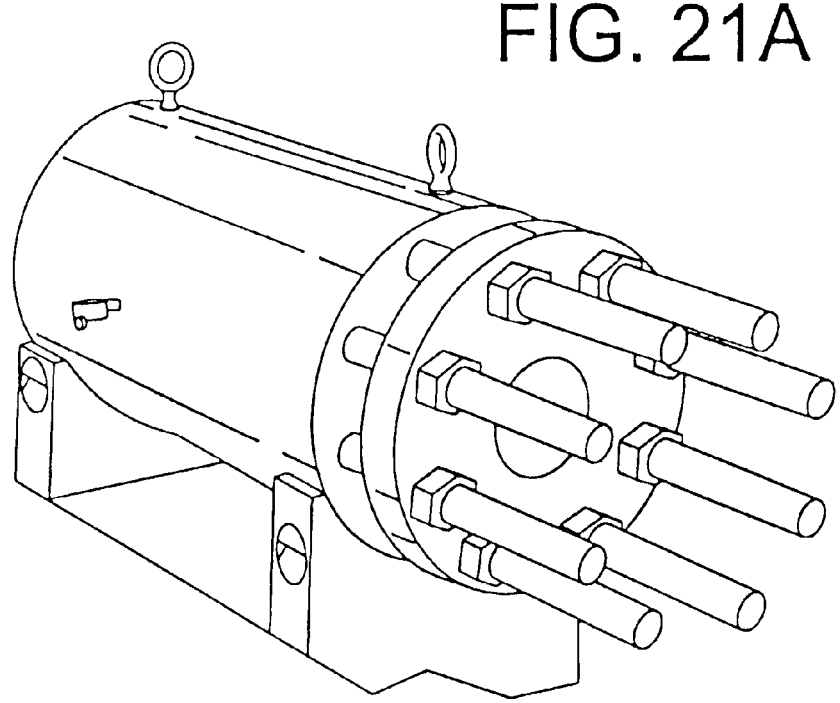
FIGS. 21a–b shows two views of the 30-ton CDDC device mounted on an I-beam.
Figure 21B:
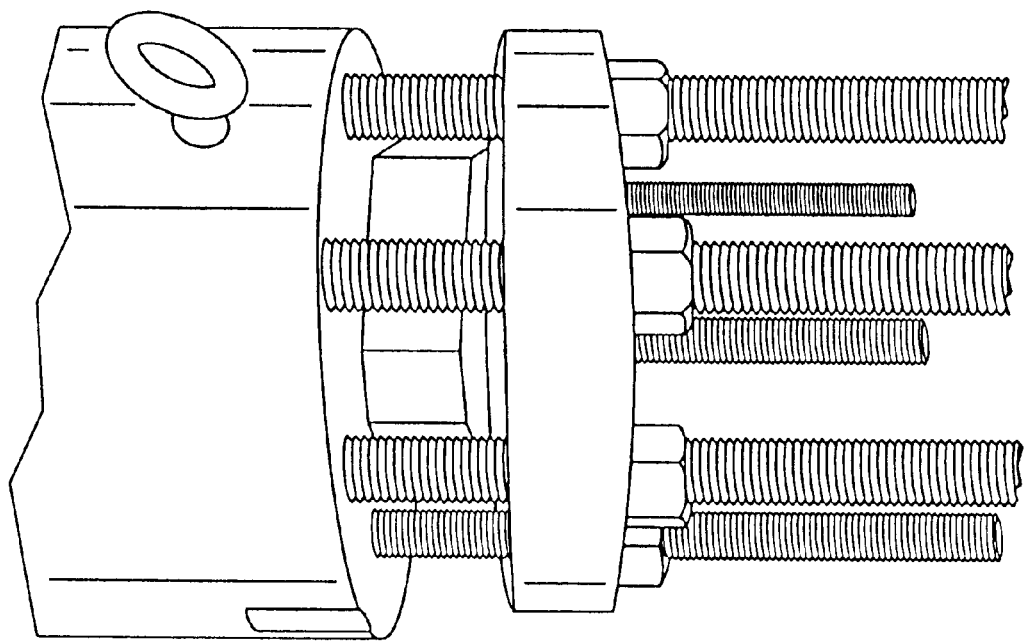
Figure 22A:
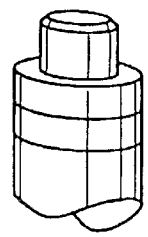
FIGS. 22a–d shows several views of a half-inch diameter ring die and compacted sample.
Figure 22C:
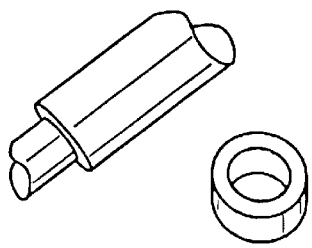
Figure 22B:
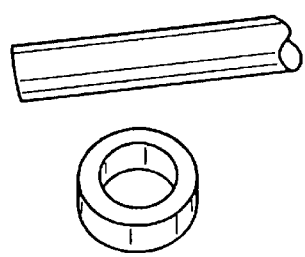
Figure 22D:
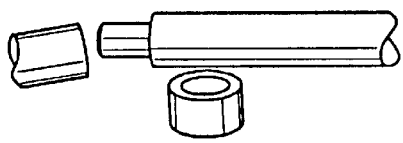

Testing in the second CDDC prototype, shown in FIG. 19, revealed the CDDC process to be both robust and versatile at compacting various types of powder materials. This larger CDDC device applied up to 300,000 pounds per square inch (150 tons per square inch) to one-half inch outer diameter, ⅝ inch inner diameter, ring shaped compacts of various materials, as shown in Table 3. FIG. 20a shows the same device with a volume filler to change the volume of the combustible gas. FIGS. 20b, c and d show additional detail of the compaction chamber, seals, ignitor, and pressure sensor. FIG. 21 shows photographs of two views of the hardware.

Figure 23A:
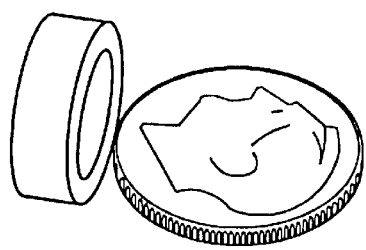
FIGS. 23a–c shows several close-up views of ring geometry compact made in the 30-ton CDDC device.
Figure 23B:
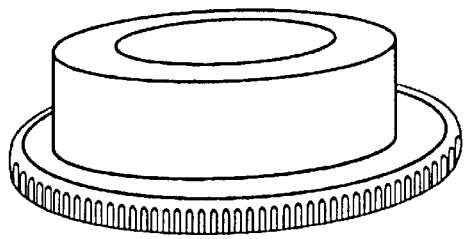
Figure 23C:
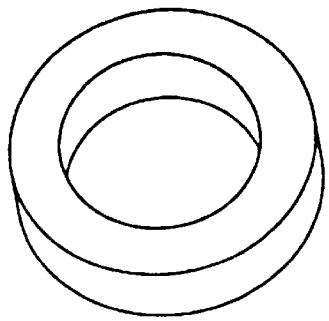
Figure 24:
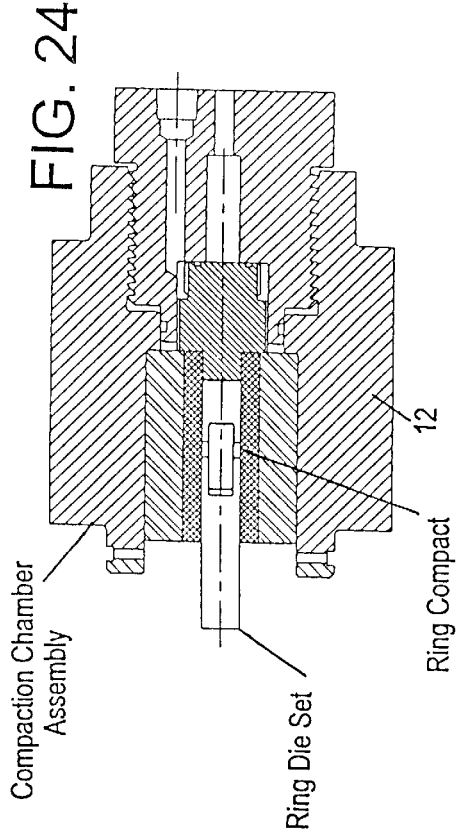
FIG. 24 shows additional details of the ring geometry die.
Figure 25:
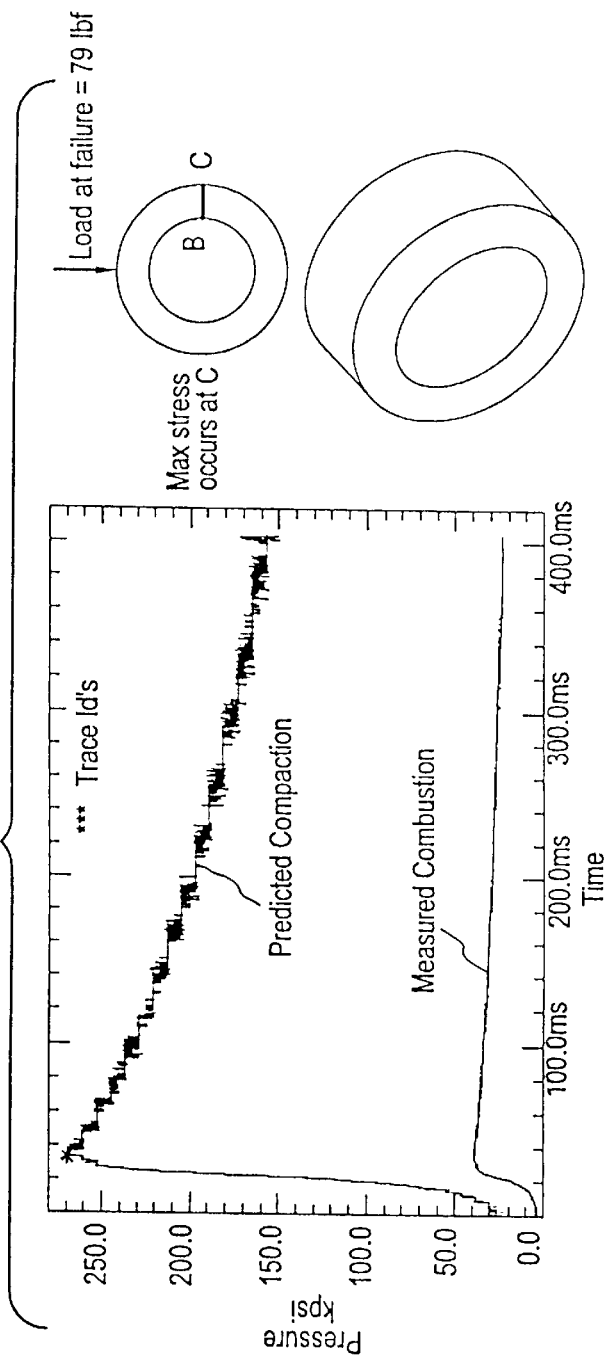
FIG. 25 shows loading conditions and property data for a stainless steel ring compacted in the 30-ton CDDC device.
Figure 26:
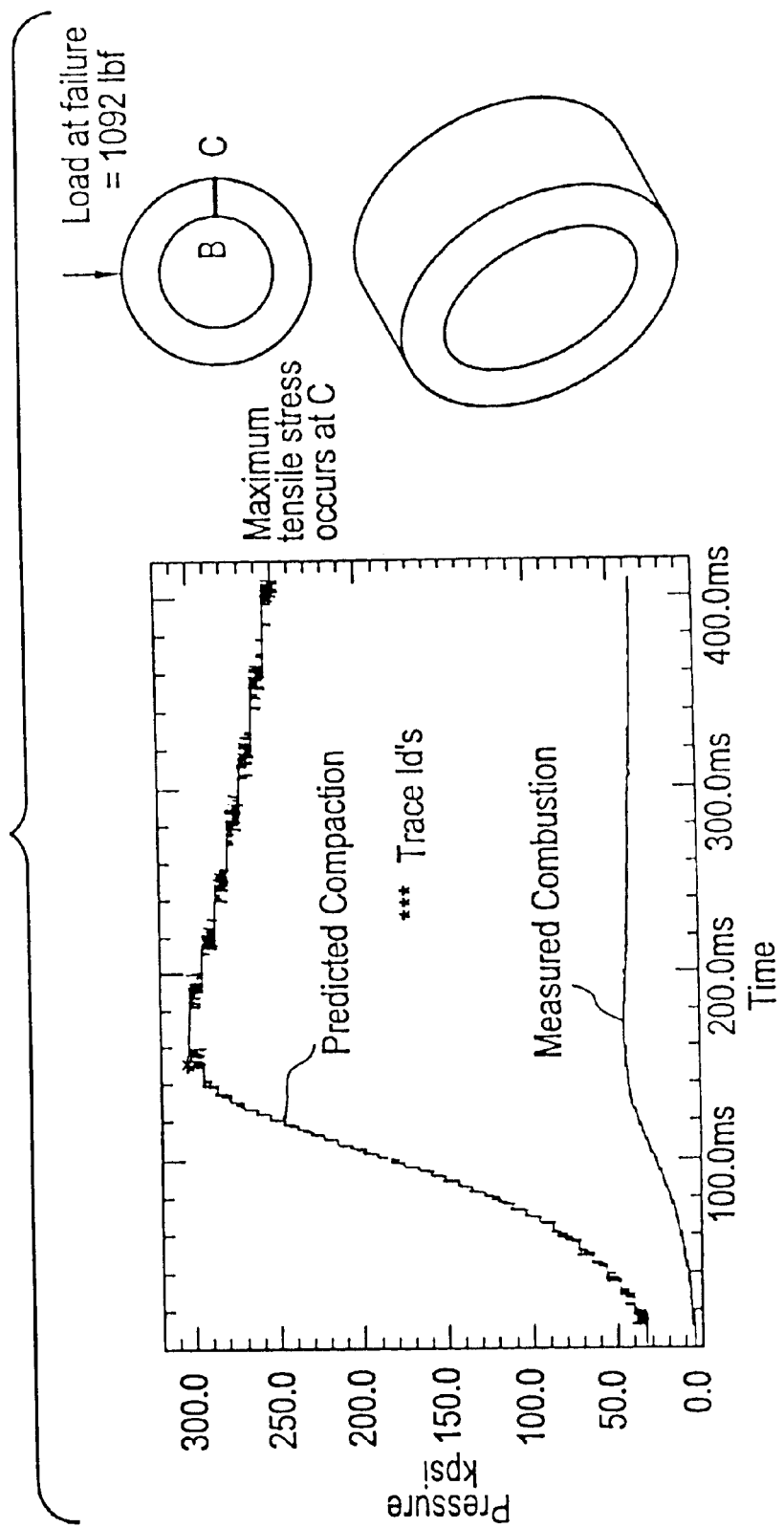
FIG. 26 shows loading conditions and property data after sintering for a stainless steel ring compacted in the 30-ton CDDC device.

Typical ring compacts are shown in FIGS. 22 and 23. The compaction chamber configuration and the ring die set are shown in FIG. 24. Typical combustion and compaction pressures along with densities and mechanical properties for stainless steel powders compacted by the enhanced CDDC press are shown in FIG. 25. Properties for one of these CDDC compressed samples after sintering are shown in FIG. 26. In the 30-ton press, static sealing of the gases was performed by seals incorporated into the ram as described previously. No diaphragm or ram restraints were used. In this configuration the ram is pressed into the powder during filling of the gas, preloading the powder before ignition. A horizontal mounting arrangement was retained for simplicity. Densities of the compact immediately after pressing but before sintering were very high relative to traditional pressing densities. For example the densities of the samples shown in FIG. 26 was about 94 percent of wrought density while conventional presses typically produce densities in the high 80 percent range. These increased densities are also reflected in the strength of the part immediately after pressing (i.e. the green state), where the tensile properties can be 4 to 5 times as high as those produced by conventional presses. The higher densities also produced significantly higher tensile strengths after sintering and reduce or eliminate shrinkage of the part.

Figure 27:
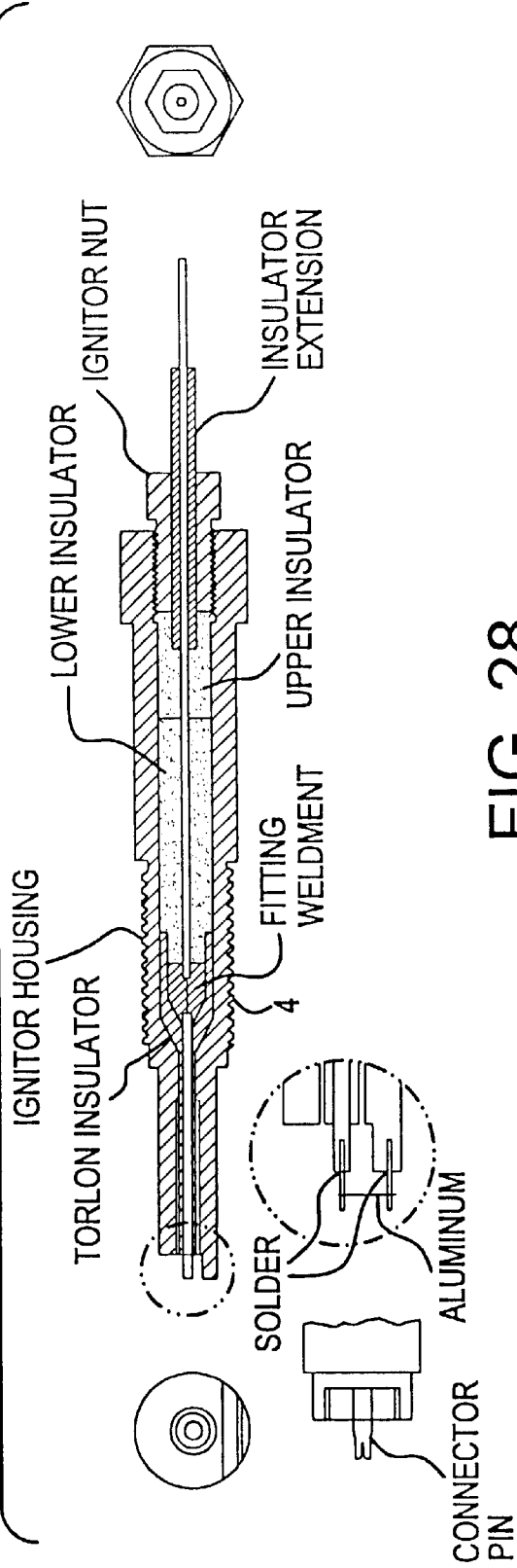
FIG. 27 is a view of a typical exploding wire ignitor assembly.
Figure 28:
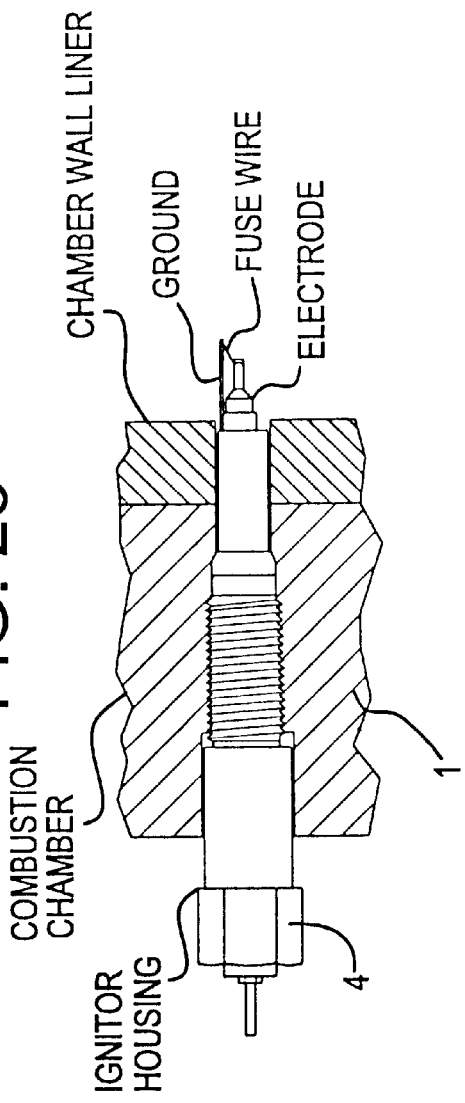
FIG. 28 shows additional details of a typical exploding wire ignitor assembly.

Additional ignitor embodiments are shown in FIGS. 27 and 28.

Example 3—300 Ton Press

A third and larger prototype CDDC press further shows the versatility and performance capability of CDDC presses and technology. The internal details of this press were shown previously in FIG. 1. Externally the press looks as shown in FIGS. 29a and 30a, b, and c. Shown there also is the steel framework which supports the compaction unit above the die table. To the left is the cabinet containing the gas pumping system.

Figure 31:
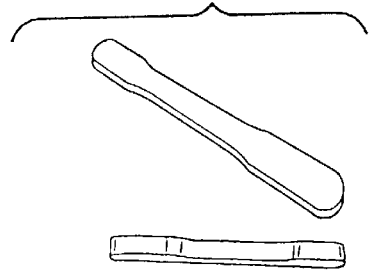
FIG. 31 shows typical dogbone tensile testing samples made in the 300-ton CDDC device.

This 300-ton press has compacted standard Metal Powder Industries Federation (MPIF) standard 10 tensile test bars of various materials at pressures exceeding 300,000 pounds per square inch (150 tons per square inch). A typical test bar of 1 square inch surface is shown in two views in FIG. 31.

As seen in FIG. 1 the 300-ton CDDC press is mounted in the more traditional vertical orientation and uses standardized die sets placed under the press on the incorporated table. The sealing system for the ram has also been substantially improved as shown in FIG. 1. The 300-ton press ram incorporates two ring seals 7b, one o-ring seal 7c, and an obturator or Bridgeman seal 7a. Together these seals provide both static and dynamic sealing capable of withstanding the combustion temperatures, which can reach 3000 degrees K. In additional all "through chamber" fittings and gages are now incorporated into a replaceable sealing plug 3. This reduces potential leak paths in the chamber itself. In addition multiple versions of the sealing plug 3 can economically incorporate different configurations of igniters, gages, fill ports, etc. The 300-ton chamber also utilizes a removable end cap held on by multiple high-strength bolts. This cap can be easily removed for access to the inside of the chamber if desired. The 300-ton press also incorporates features such as an improved surface discharge igniter and a load cell under the die set to monitor the actual pressure in the powder.

Results from mechanical testing of several materials compacted in the 300-ton press are shown in Tables 4 through 7. Large increases in mechanical properties such as density, green strength, and sintered strength over conventional powder pressing techniques are readily apparent from these tables. In addition, the shrinkage of the part when sintered is nearly eliminated. The construction of the CDDC press itself is considerably simpler than conventional mechanical or hydraulic presses and incorporates only one moving part, the ram 7.

Example 4—3000 Ton Press

Figure 29B:
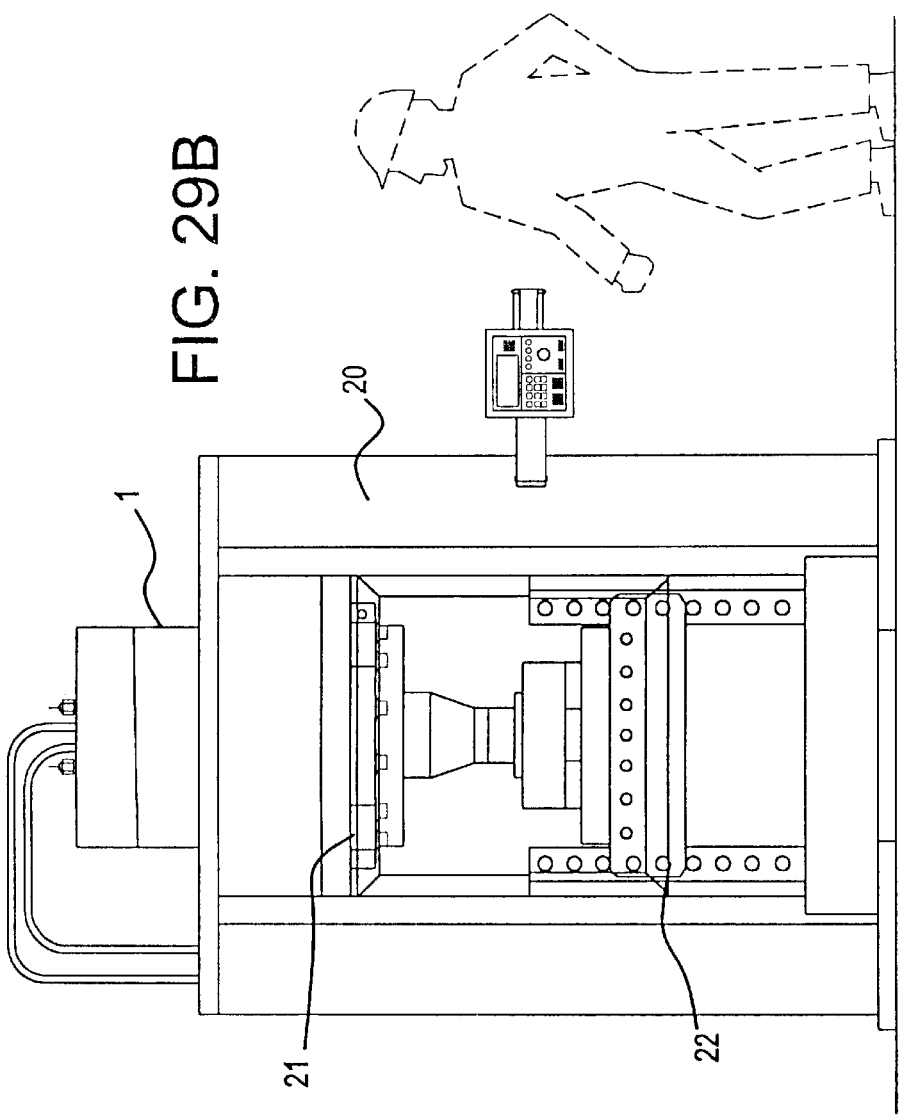
FIG. 29 shows typical sizes of 300 and 3000 ton rated CDDC presses.
Figure 29A:
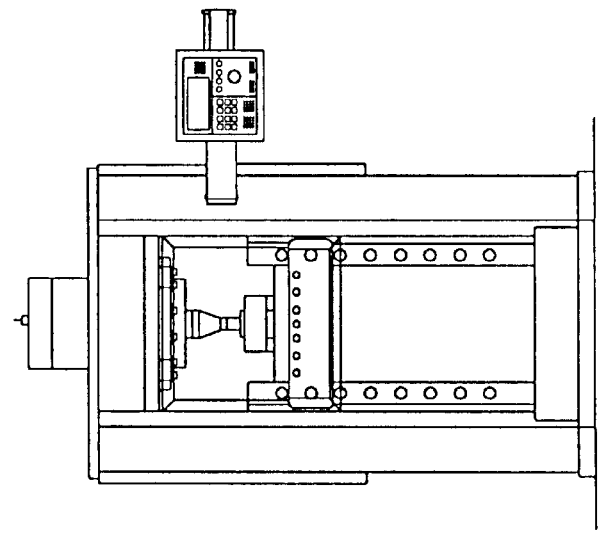
Figure 30A:
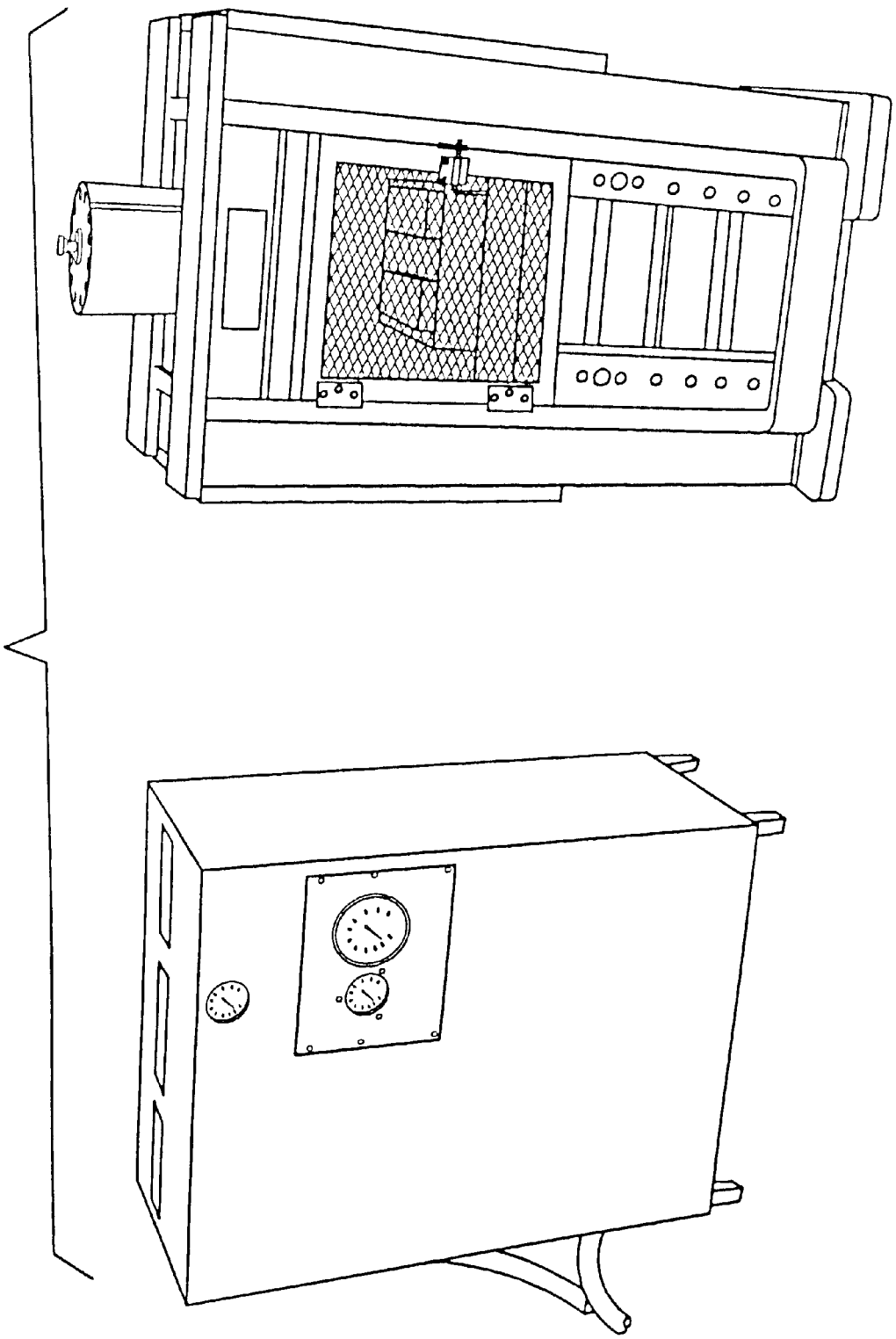
FIG. 30A shows views of the 300-ton CDDC press (right) and supporting hardware (left).
Figure 30B:
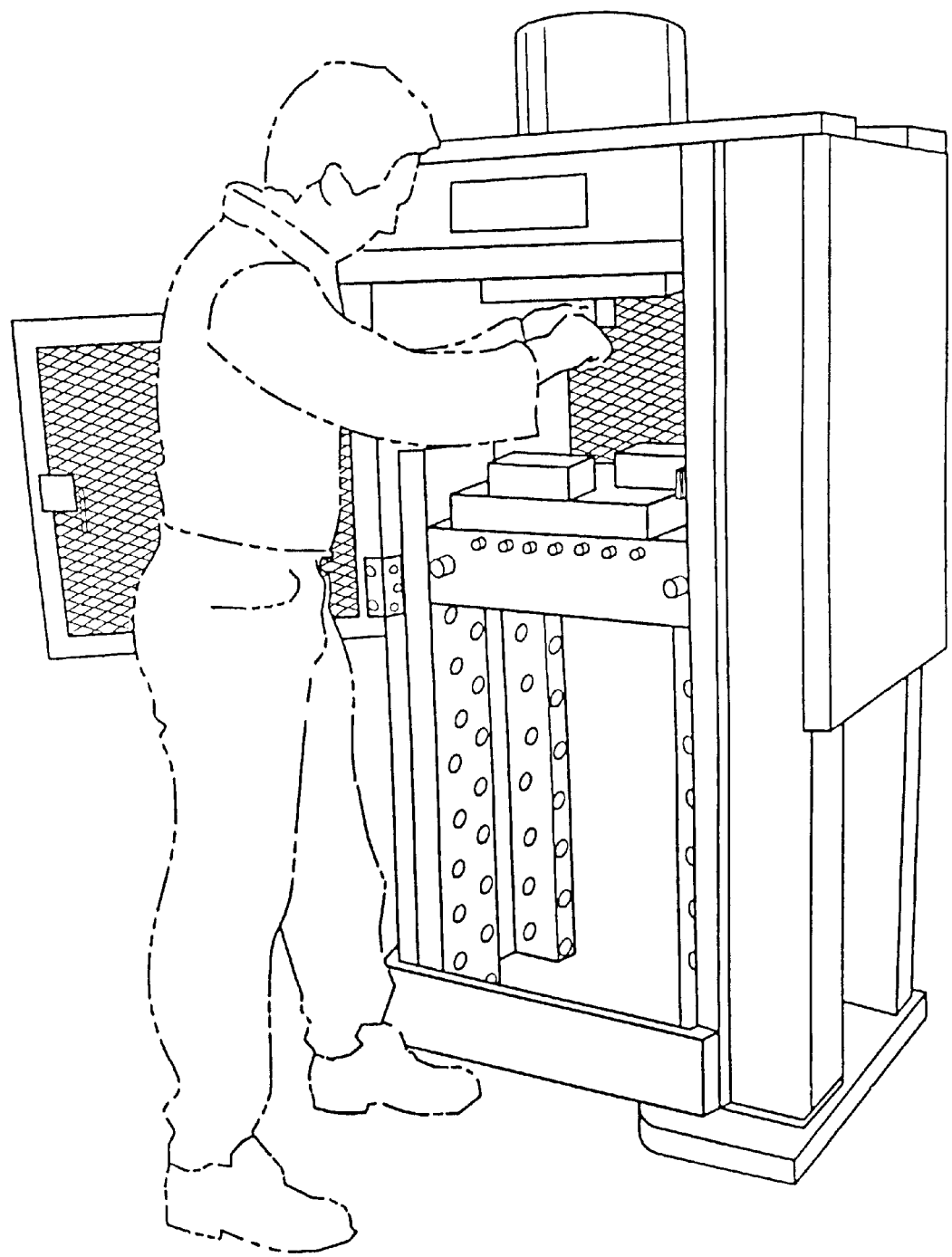
FIG. 30B shows view of the 300-ton CDDC press with a person included for scale.
Figure 30C:
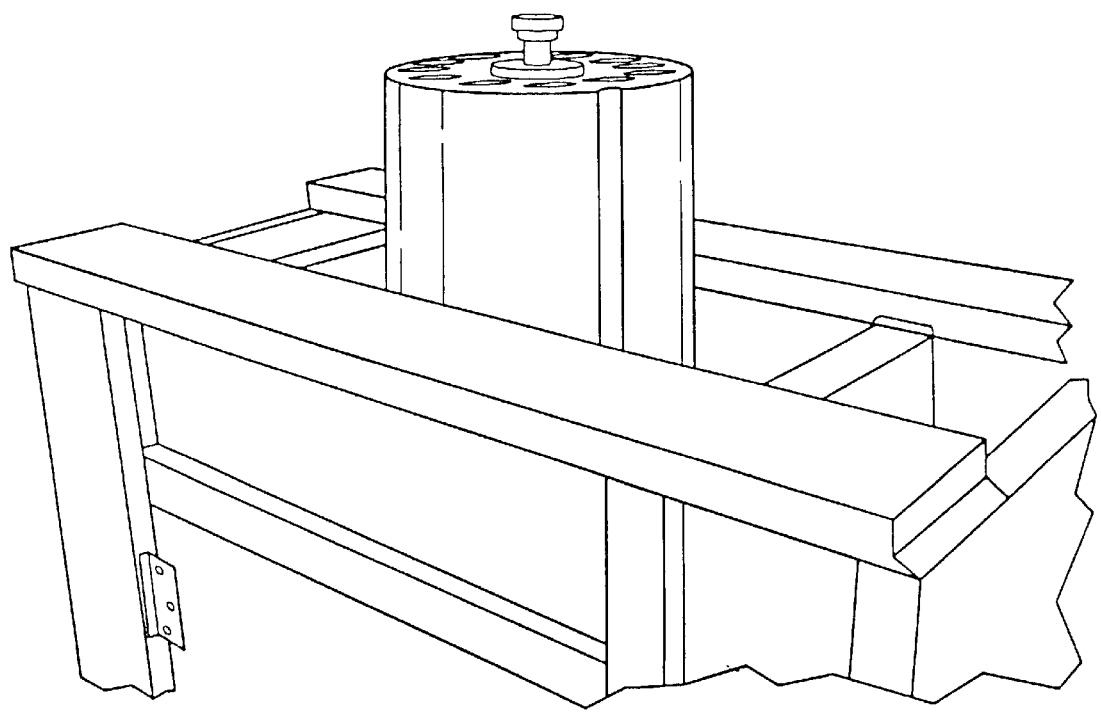
FIG. 30C shows top portion of the 300-ton CDDC press with combustion chamber in center of view.

A dynamic compaction press design capable of delivering 3000 tons is shown in FIG. 29B in proper scale to the 300-ton press shown in FIG. 29A. Note that this press, although large relative to the previous examples, is still much smaller than conventional mechanical or hydraulic presses of this capacity. For example a conventional 3000-ton press may stand 30 feet tall and have a footprint of 400 square feet while a 3000-ton CDDC press would be about 10 feet tall and 100 square feet respectively. Combustion driven compaction devices are by nature relatively compact as the necessary energy is directly converted from the chemical state. It is expected that even larger output presses using the CDDC process are both feasible and relatively compact. It is also expected that such presses will be inexpensive relative to conventional presses.

Pressure Profile Control

Figure 32:
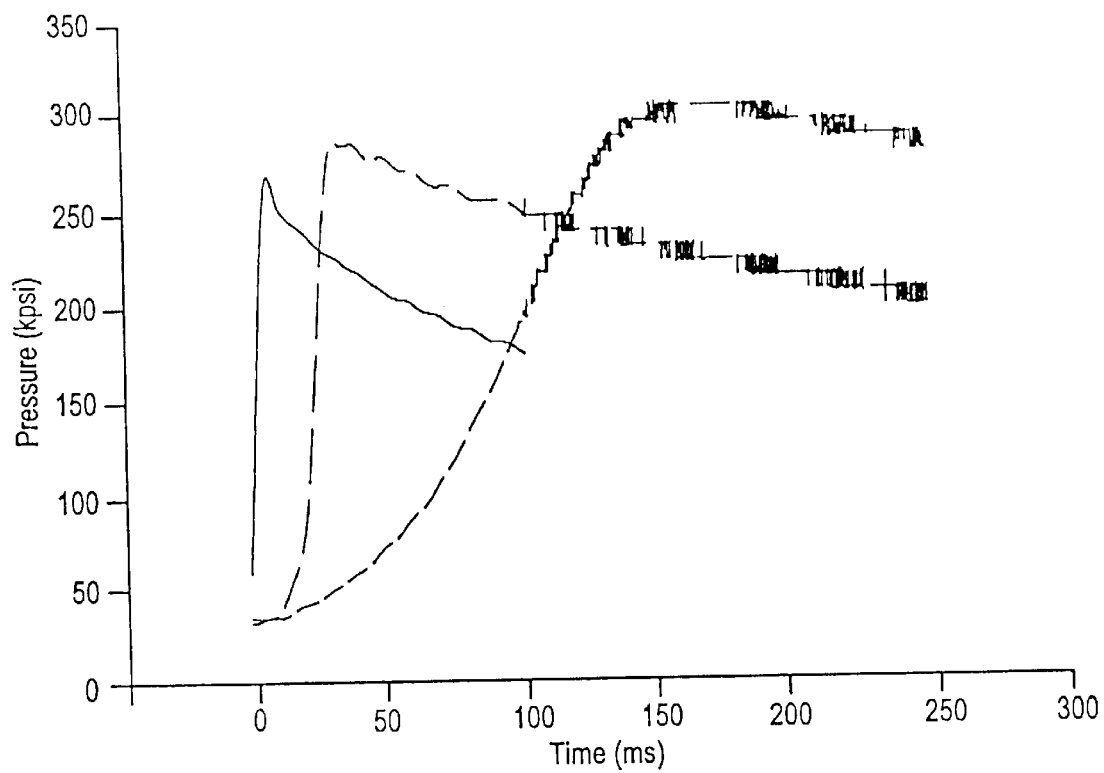
FIG. 32 shows several pressure versus time profiles generated in the 300-ton CDDC device using different fuel chemistries.
Figure 33:
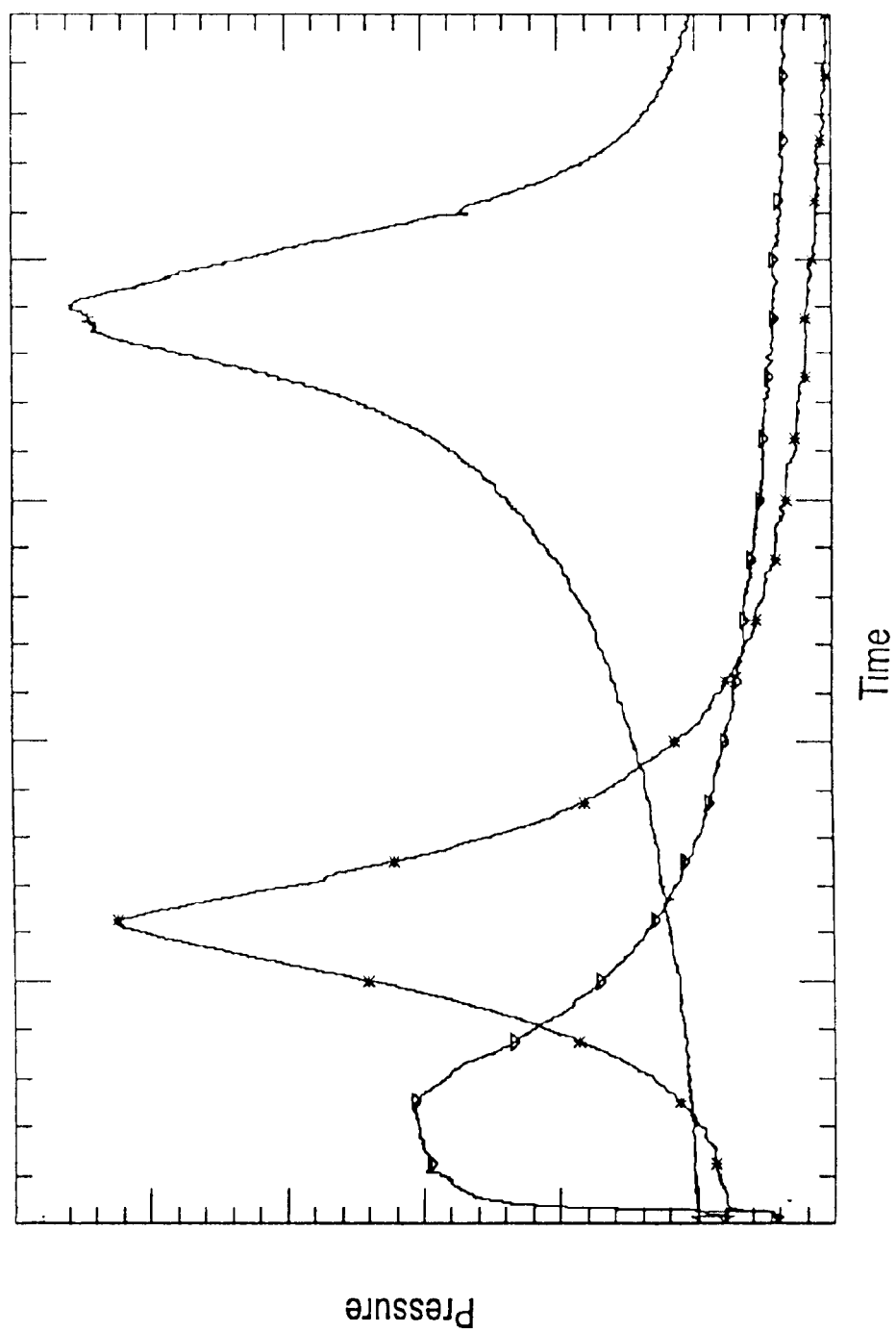
FIG. 33 shows generic pressure versus time profiles.

In all embodiments of the invention, diaphragms, fast valves and adjustable diameter exhaust ports or orifices can be used to provide additional control of the pressure time history beyond that provided by the gas mix, prefill pressure, and ignition parameters. FIG. 32 shows an example of the pressure profile control resulting from simple adjustments in the gas mix. FIG. 33 shows an illustration of what could be expected if diaphragms and valves were positioned at strategic locations throughout the pressure chamber, and their actuation timed to lower the pressure faster than it would from just heat loss alone through the walls. At the peak desired pressure for the three illustrative cases, one or more diaphragms or fast valves suddenly open, allowing gas to quickly vent and quickly cause the pressure to drop. This provides an additional mechanism for pressure control and for rapidly evacuating the chamber in preparation for the next pressure compacting pulse.

Figure 34:
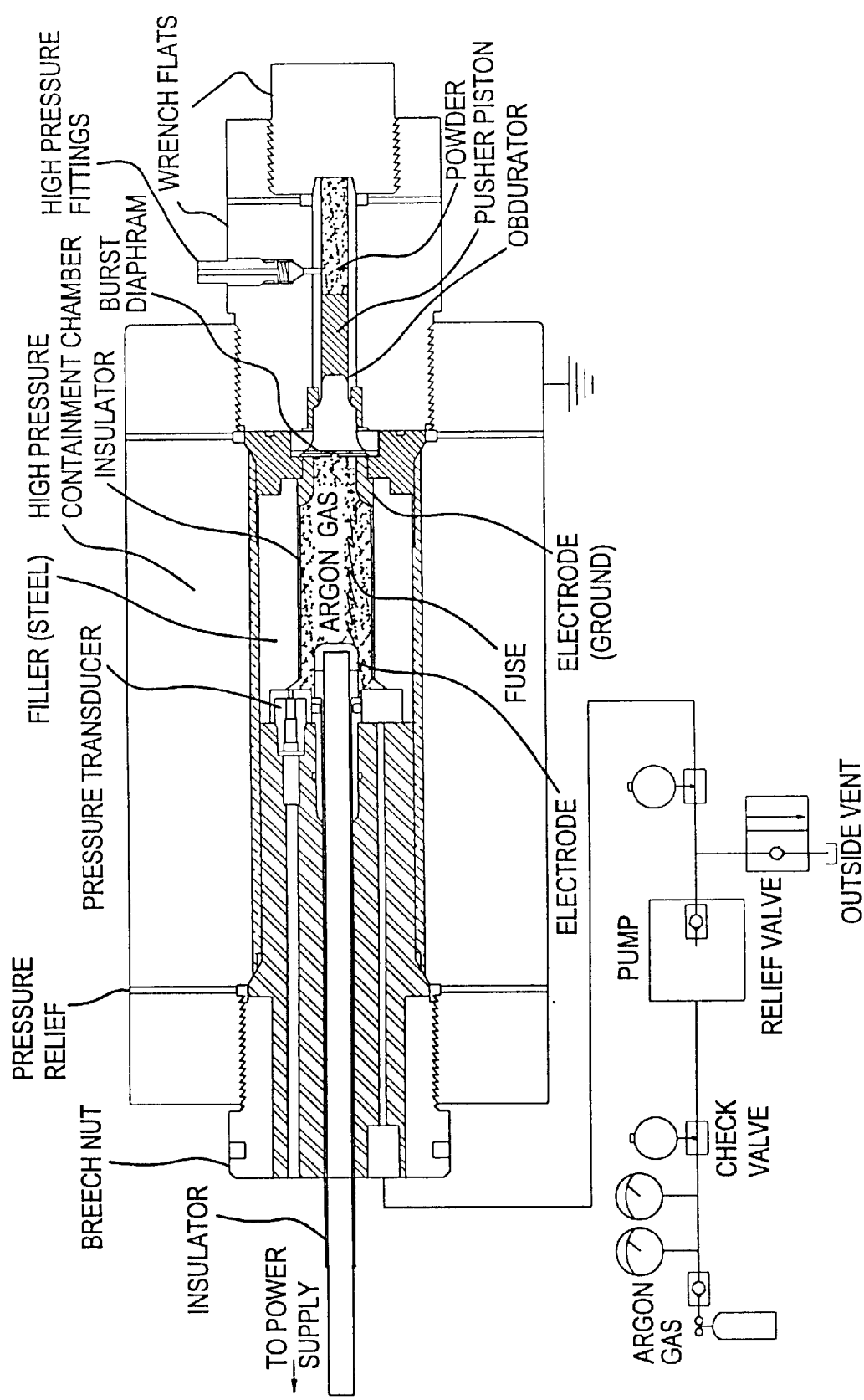
FIG. 34 shows details of the Electric Driven Dynamic Compaction (EDDC) Device.

In another preferred embodiment of the invention, shown in FIG. 34, the high pressure gases are produced not by a combustion process, but by an arc discharge in a prefilled pressurized gas. In this embodiment, called Electric Discharge Dynamic Consolidation, the combustion chamber of the most preferred embodiment is replaced by a chamber with an insulating inner wall, with electrodes located at opposite ends of the chamber. The chamber is first pressurized to high pressure with a working gas. A fuse is placed in contact with each electrode across the length of the chamber. A diaphragm or a tight seal contains the high pressure gas. When an external switch is closed, high voltage from energy storage capacitors is placed across the fuse, which quickly vaporizes and causes an arc to form in the high pressure gas. The high power arc quickly heats the gas, causing the pressure to rise to a high value, bursting the diaphgram and forcing the pusher piston, or ram, to compact the powders. In principle, any working gas could be used, but in practice, it is probably best to use inert gases such as argon. The expected operating parameters and requirements for the repetitive device are similar in nature and order of magnitude to those for the combustion version of the present invention.

The insulating wall would be a ceramic coating or a ceramic tube jacketed by a heat shrunk steel tube to contain the ceramic and always keep it in compression. A ceramic insulating wall is ideally nonablating and would thus last indefinitely. A diaphragm is generally necessary to contain the high prefill pressure of this preferred embodiment, but not absolutely necessary if prefill presures were limited to only a few thousand psi.

Figure 35:
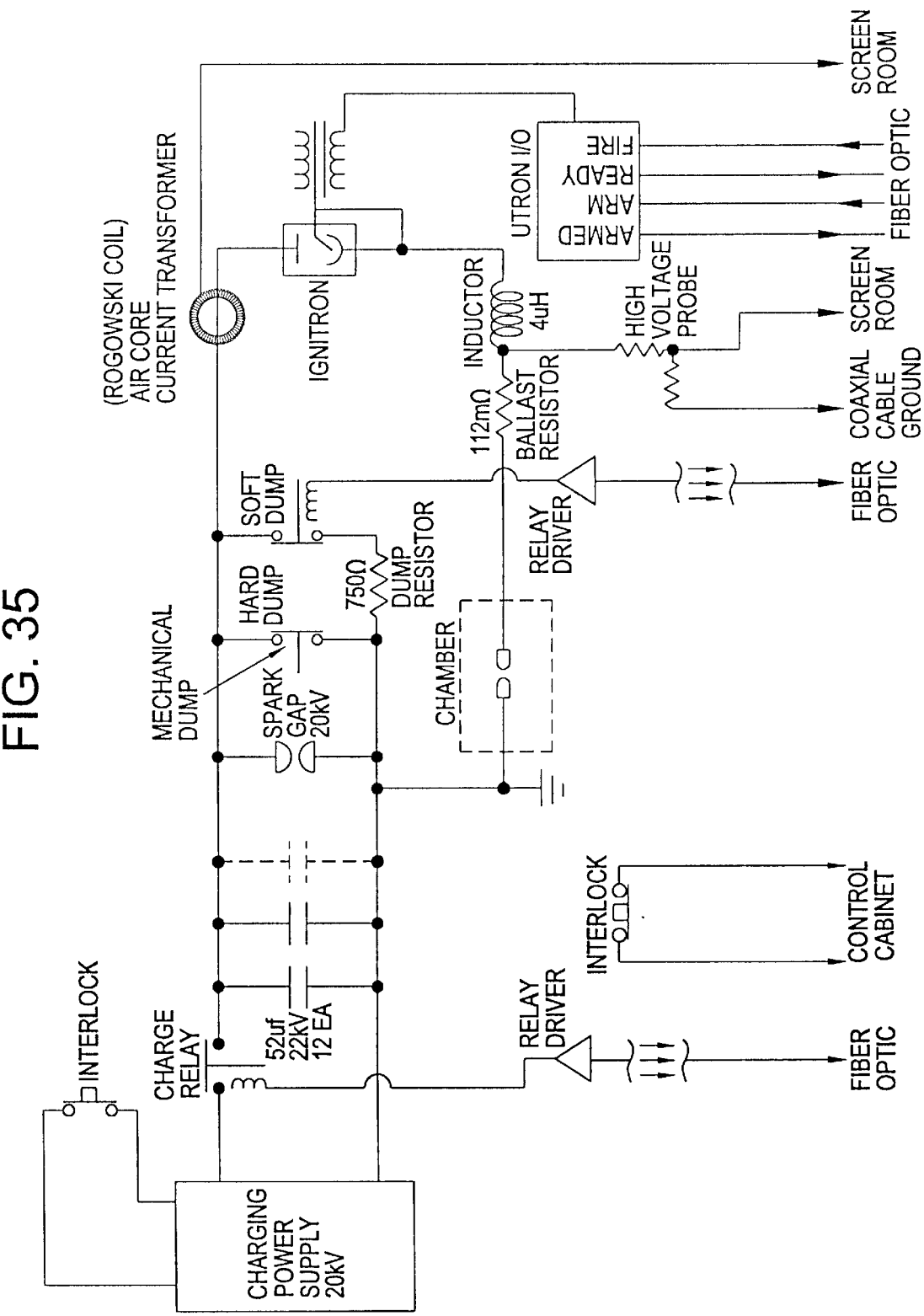
FIG. 35 shows typical supporting electrical schematic for the EDDC and ETDC devices.

Current to the discharge is typically supplied by a Pulse Forming Network (PFN) and high voltage charging circuit. FIG. 35 shows a representative example. When switch S (an ignitron) is closed, high voltage is switched across the electrodes, followed by heating and vaporization of the metal foil fuse. The PFN capacitance and inductance values determine the pulse width of the current. The pulse width $\tau$ is given by $\tau=2CZ$, where C is the total PFN capacitance, $Z=(L/C)^{1/2}$ is the PFN impedance, and L is the total PFN inductance. The inductance can be distributed among the capacitors to provide pulse shaping. The charging voltage and the circuit impedances determine the peak current. Discharge resistances are typically about 100 mΩ. The ideal transfer efficiency from the PFN to the discharge load is given by $\eta=4\ (R/Z)/(1+R/Z)^2$. For matched loads, the transfer is 100%. This cannot be achieved in practice because of parasitic losses in the switch and leads, but these losses are typically small. Note that even for a grossly mismatched circuit in which R=Z/2, the transfer efficiency has only dropped to 89%. Expected bank voltages could go to a few tens of kilovolts, with discharge currents exceeding 100 kA in some cases.

Figure 36:
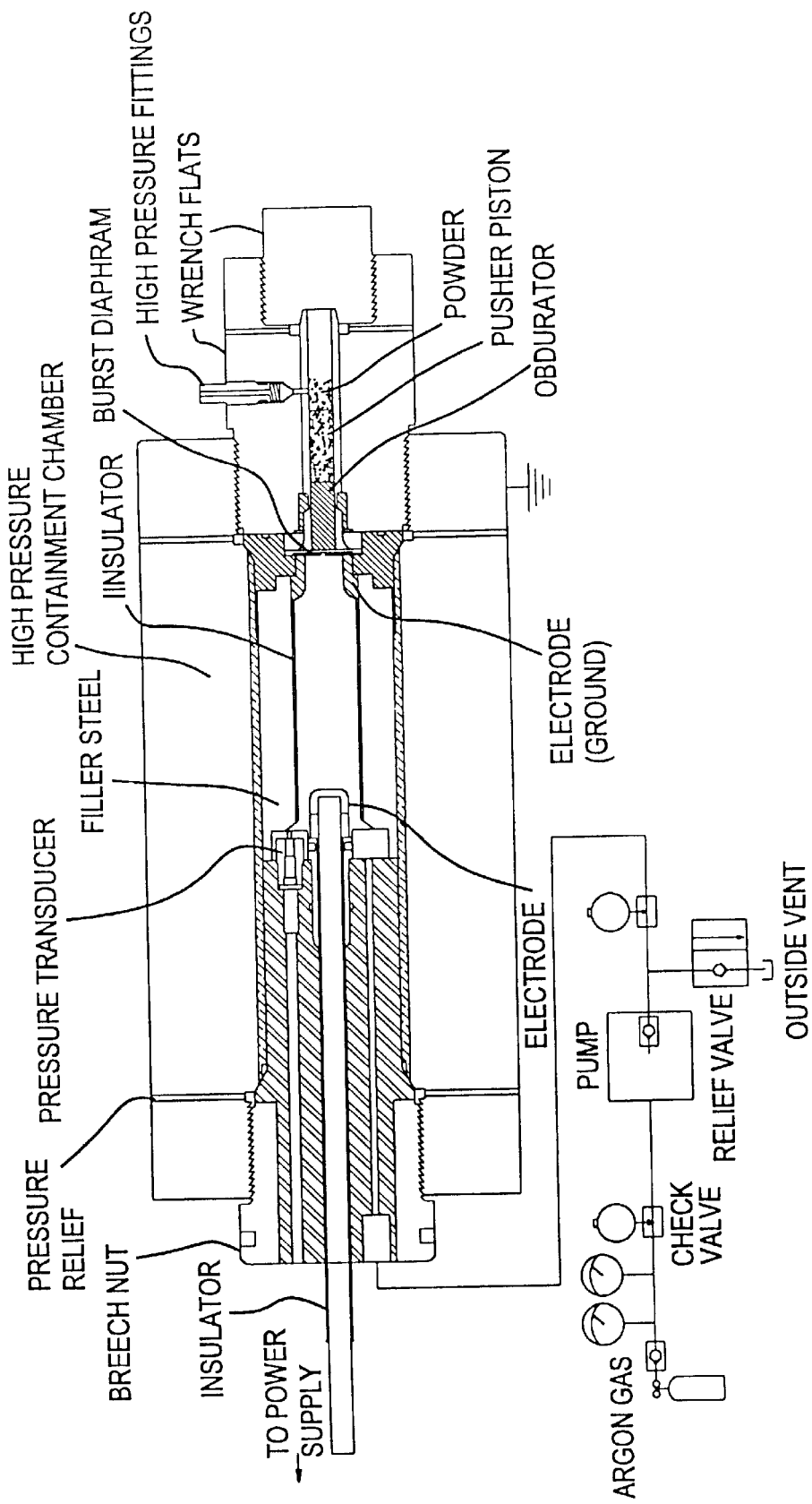
FIG. 36 shows details of the Electro-Thermal Dynamic Compaction (ETDC) Device.

In yet another preferred embodiment of the present invention, illustrated in FIG. 36, high pressure gases are produced not by a combustion process but by an arc discharge in a confined capillary. The gases are produced by the ablation of a consummable electrically insulating wall in the presence of a high temperature arc discharge, or by ablating and vaporizing solid or liquid materials placed into the confined capillary channel such that the liquid or solid material is directly exposed to the high temperature arc discharge.

A variation of the Electric Discharge Dynamic Consolidation configuration described above, called ElectroThermal Discharge Consolidation is accomplished by stretching the length and/or reducing the inner diameter of the high pressure region into a configuration often referred to as a capillary. It is called a capillary because of its high length/diameter ratio, which can typically be on the order of 10 to 1, sometimes more. Electrodes are again located at each end of the capillary. The working fluid is typically produced by ablating a plastic liner and/or by vaporizing various liquids, gels, or solid materials placed inside the capillary volume.

In the case where the working fluid is provided by ablating and vaporizing fill materials placed within the capillary, the insulating wall would typically be a ceramic coating or a ceramic tube jacketed by a heat shrunk steel tube to contain the ceramic and always keep it in compression. The ceramic insulating wall is thus ideally nonablating and would thus last indefinitely. This is the same functional form as for the EDDC configuration but with different length/diameter ratios The arc discharge again produces a very high pressure with a rapid pressure rise rate. The pressure profile is primarily controlled by adjusting the parameters of the inductors and capacitors in the pulse forming network driving the arc current as was also the case for the EDDC configuration.

This configuration does not necessarily require the use of a burst diaphragm, since no high pressure prefill gases need to be contained. However, a diaphragm could be used to provide a sudden pressure transfer to the compacted part as the diaphragm bursts or shears in the case of a shear diaphragm, if such were desired. A piston transfers the pressure to the powder to be compacted. Arc initiation is accomplished either with a fuse or by high voltage breakdown.

The use of pulsed electrical energy to heat the working gas eliminates the need for dealing with combustible gas mixes, a potential safety advantage in some cases, and also provides the potential for greater control over the pressure time history via means of controlling the arc discharge current.

The combustion technique is probably the approach of choice when very large energies are required for large compacts, since providing pulsed electrical energies of tens or hundreds of Megajoules is difficult and expensive, but easy and cheap with chemically supplied energy in the form of combustible gases. The pulsed electrical energy approaches described below seem to be best suited for smaller compacts requiring no more than a few Megajoules of energy, but is certainly not limited to such a value.

Figure 37:
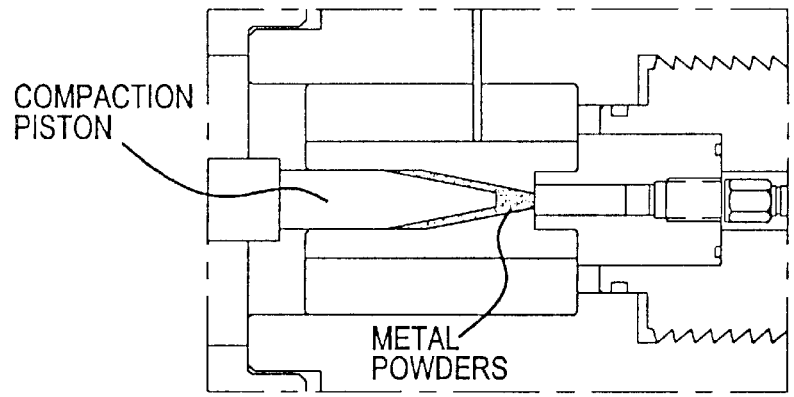
FIG. 37 shows a die configuration for the compaction of a simple generic cone shaped nozzle.
Figure 38:
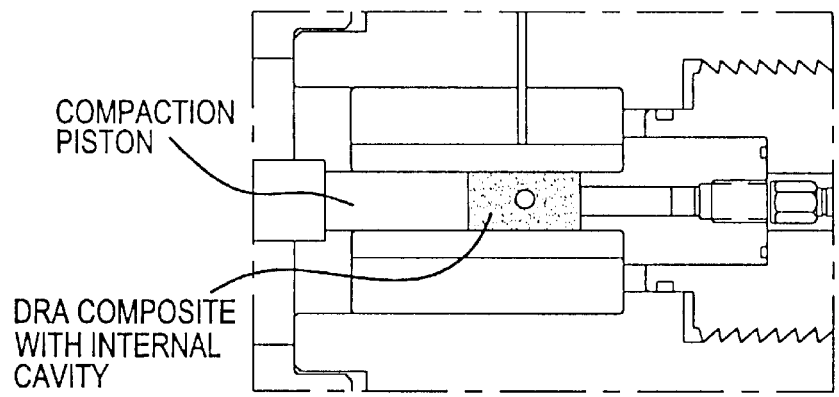
FIG. 38 shows a die configuration for the compaction of a part with internal voids and functional gradients.
Figure 39:
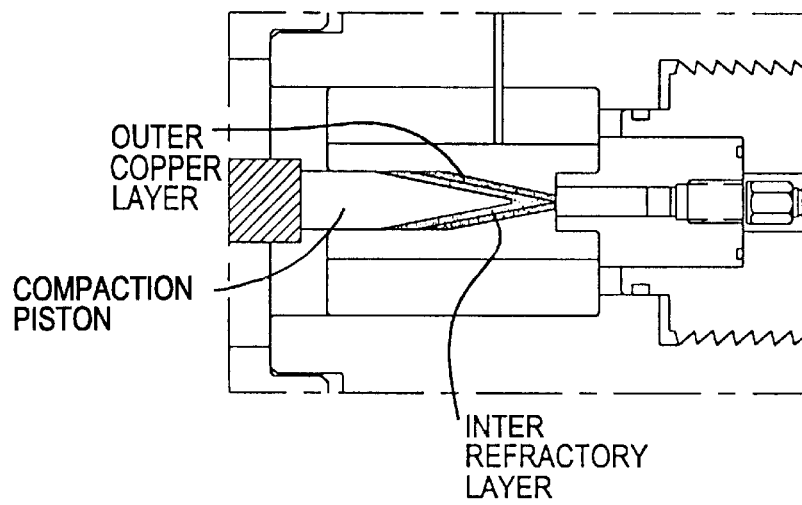
FIG. 39 shows a die configuration for the compaction of a nozzle shape with functional gradients.

The utility of the invention in all its embodiments, even beyond that which has already been shown, is illustrated additionally in FIGS. 37–39. Internal voids, cavities, channels, etc. can be placed within the part by locating appropriately shaped fillers inside the powder prior to compaction. The filler material would be chosen so that it could be easily removed after the compaction process is complete either by melting out or perhaps through a chemical etching process. Several simple examples are shown schematically in FIGS. 37–39. These are only simple examples illustrating possibilities. Many configurations are possible. As a further example, nozzles could be manufactured with integral cooling channels embedded within the walls using a single wire cooled around through the powder, and then melted or etched out afterwards.

The high green strength and extremely low shrinkage during sintering allow compaction of what would otherwise be relatively fragile parts in the green state, and which would tend to warp under the usual sintering induced shrinkage.

TABLE 1

AMPAL 611 Starting Al Powders

| | |
|---|---|
| Powder Composition | 99.7% mm Al, 0.2% max Fe 0.1% max Si. |
| Average Particle Diameter | 50 to 60 μm |
| Screen Analysis | +100 Mesh: 0.1 −100 + 200: 0.1 −200 + 325: 30.1 −325 Mesh: 69.7 |
| Apparent Density, g/cm² | 1.01 |
| Surface Area, m²/g | 0.15 to 0.25 |

TABLE 2

Experimental Parameters

AMPAL 611 Al powders, L/D of Compact = 0.5

| All Shots Shot # | Lubricant (wt %) | Total Energy (kJ) | Resultant Pressure (kpsi) |
|---|---|---|---|
| 1 | 1.5 | 110 | 9 |
| 2 | 1.5 | 133 | 23 |
| 3 | 0 | 197 | 31 |
| 4 | 0 | 304 | 47 |

TABLE 3

| Material | Load (tons) | Density |
|---|---|---|
| Aluminum | 90 | 98 |
| Copper | 23 | 87 |
| Molybdenum | 96 | 76 |
| Stainless Steel (316) | 92 | 85 |
| Stainless Steel (410) | 153 | 94 |
| Tantalum | 124 | 88 |
| Molybdenum | 96 | 76 |
| Titanium | 111 | 94 |
| Al/Al2O3 | 132 | 94 |
| Ti on Al | 139 | — |
| Ta on 410 | 132 | — |
| Mo on 410 | 132 | — |

TABLE 4

Test results at 100 tons with MPIF standard 10 test bar for 316 SS

| | Green Properties | | | Sintered Properties | | | | |
|---|---|---|---|---|---|---|---|---|
| Material | Density g/cc | Density % of wrought | Strength psi | Density g/cc | Hardness HRB | 2% Yield Strength - psi | Tensile Strength - psi | % Elongation |
| Hoeganaes at 100 tons | 7.50 | 94 | 6,550 | 7.52 | 82 | 33,200 | 71,300 | 29 |
| Hoeganaes | 6.72 | 84 | 1084 | 6.82 | 71 | 36,000 | 67,000 | — |
| MPIF | — | — | — | 6.9 | 45 | 30,000 | 57,000 | 21 |
| % Increase | 12 | 12 | 504 | 9 | 16 | 8 | 6 | 38 |

Hoeganaes Ancor 316L, Grade 100 is powder tested at 100 tons with no lubricates or binders in powder, Sintered by SSI Technologies in $H_2$ for 45 minutes at 2450° F.
MPIF standard SS-316L-22 sintered at 2350 F. in partial vacuum
Percent increase as compared to best of either MPIF or Hoeganaes standards
All CDDC press sample test data provided by independent laboratory, Powder-Tech Associates, Inc.

TABLE 5

Test results at 100 & 150 tons with MPIF standard 10 test bar for Iron Powder

| | Green Properties | | | Sintered Properties | | | |
|---|---|---|---|---|---|---|---|
| Material | Density g/cc | Density % of wrought | Strength psi | Density g/cc | 2% Yield Strength psi | Tensile Strength psi | % Elongation |
| Iron Hoeganaes Ancorsteel 1000B presses at 100 tons | 7.72 | 98 | — | 7.71 | 29,000 | 45,900 | 22 |
| MPIF | — | — | — | 7.3 | 25,000 | 38,000 | 7 |
| % Difference | — | — | — | 6 | 16 | 21 | 214 |
| 1000B at 150 tons | 7.76 | 99 | 11,500 | | | | |

Hoeganaes Ancor 1000B (H1000) tested at 100 tons, no lubricates or binders in powder, Sintered in DA for 30 minutes at 2050° F.
MPIF standard F-0000-20 sintered at 2350° F. in partial vacuum
CDDC press sample test data provided by independent laboratory, Powder-Tech Associates, Inc.

TABLE 6

Test results at 100 tons with MPIF standard 10 test bar for Titanium Powder

| | Green Properties | | |
|---|---|---|---|
| Material | Density g/cc | Density % of wrought | Strength psi |
| Titanium Sponge Powder at 100 tons | 4.389 | 97 | 18,100 |

TABLE 7

Test results at 150 tons with MPIF standard 10 test bar for Ancorsteel 737 SH

| | Green Properties | | | |
|---|---|---|---|---|
| | Density | Density % | Apparent Hardness Rc | |
| Material | g/cc | of wrought | After Sintering | After Tempering |
| Hoeganaes Ancorsteel 737 SH at 150 tons | 7.56 | 96 | 55 | 51 |

CDDC press sample test data provided by independent laboratory, Powder-Tech Associates, Inc.

What is claimed is:

1. The method of forming parts, comprising:
   providing a combustion chamber;
   providing a die having a die cavity and fixed and movable die parts;
   providing a piston connected to the chamber;
   connecting the piston and the movable die part;
   filling the die cavity with particulate material;
   pressurizing the chamber with a combustible gas mixture;
   moving the piston and the movable die part upon the pressurizing of the chamber;

precompressing the particulate material in the die cavity with the pressurizing;

igniting the combustible gas mixture;

combusting the combustible gas mixture;

increasing pressure in the chamber with combustion products of the combustible gas mixture;

driving the piston in a direction away from the chamber;

pushing the movable die part toward the fixed die part;

compressing the die cavity;

compacting and consolidating the particulate material to a dense state within the compressed die cavity; and removing the part from the die cavity.

2. The method of claim 1, further comprising removing gas from the particulate material before the igniting.

3. The method of claim 2, wherein the removing gas from the particulate material comprises forcing gas from the particulate material during the precompressing of the particulate material.

4. The method of claim 2, wherein the removing gas from the particulate material comprises withdrawing gas from the particulate material in the cavity.

5. The method of claim 1, further comprising providing an inert atmosphere surrounding the die parts during the precompressing and compacting.

6. The method of claim 1;

wherein the cavity comprises a container within a die chamber;

wherein the filling comprises filling the container with the particulate material;

wherein the providing the movable die part comprises providing a fluent material in the die chamber; and wherein the connecting of the piston and the movable die part comprises connecting the piston and the fluent material.

7. The method of claim 6, wherein the providing of the fluent material comprises providing liquid, gel or solid materials;

wherein the precompressing of the particulate material comprises precompressing the particulate material within the container; and wherein the compressing comprises compressing the container.

8. The method of claim 1, further comprising exhausting combustion products from the combustion chamber;

conducting the combustion products to an ejector; and driving the ejector with the combustion products and ejecting the formed part from the die cavity with the combustion products driving the ejector.

9. The method of claim 8, further comprising moving the piston with the ejector.

10. The method of claim 9, further comprising moving the piston with the ejector pressing upon the formed part and the formed part pressing upon the piston.

11. The method of claim 1, further comprising exhausting combustion products from the combustion chamber.

12. The method of claim 1, wherein the connecting of the piston to the movable die part comprises connecting a piston having a large cross-sectional area to a movable die part having a small cross-sectional area and intensifying pressure in the die cavity.

13. The method of claim 1, further comprising warming the die and the die cavity.

14. The method of claim 13, further comprising prewarming the particulate material before filing the die cavity.

15. The method of claim 1, wherein the pressurizing with the combustible gas mixture comprises pressurizing with combustible gases mixed with a diluent.

16. The method of claim 15, wherein the combustible gas mixture comprises about 30 molar percent of combustible gases.

17. The method of claim 15, wherein the combustible gas mixture comprises about 5 to 45 molar percent of combustible gases.

18. The method of claim 1, wherein the pressurizing of the chamber comprises pressurizing the chamber with the combustible gas mixture at a pressure of from about 1,000 to 6,000 psi.

19. The method of claim 1, wherein the pressurizing of the chamber with the combustible gas mixture comprises pressurizing the chamber with mixtures of combustible gas selected from the group of combustible gases consisting of methane, hydrogen, oxygen, air and diluent gas selected from the group of gases comprising argon, helium, nitrogen and excess combustible gases.

20. The method of claim 1, further comprising cooling the combustion chamber.

21. The method of claim 1, wherein the igniting is selected from the group of ignitions comprising spark, arc, fuse wire, high voltage breakdown and surface discharge for creating sparks.

22. The method of claim 1, wherein the igniting comprises igniting the combustible gas mixture at multiple locations in the combustion chamber.

23. The method of claim 1, wherein the combusting comprises detonation of the combustible gas mixture.

24. The method of claim 1, wherein the increasing pressure in the chamber with the combustion products comprises increasing pressures to maximum within hundreds of microseconds to hundred of milliseconds.

25. The method of claim 24, further comprising maintaining the pressures for up to hundreds of milliseconds or more.

26. The method of forming parts, comprising:

providing a combustion chamber;

providing a die having a die cavity and fixed and moving die parts;

providing a piston connected to the chamber;

connecting the piston and the moving die part;

filling the die cavity with particulate material;

pressurizing the chamber with a combustible gas mixture;

igniting the combustible gas mixture;

combusting the combustible gas mixture;

increasing pressure in the chamber with combustion products of the combustible gas mixture;

driving the piston in a direction away from the chamber;

pushing the movable die part toward the fixed die part;

compressing the die cavity;

compacting and consolidating the particulate material to a formed part having a dense state within the compressed die cavity; and removing the formed part from the die cavity.

27. The method of claim 26, wherein the driving comprises driving the piston after the igniting.

28. The method of claim 26, wherein the driving of the piston occurs upon pressure in the chamber exceeding a predetermined level.

29. The method of claim 28, further comprising providing a diaphragm between the chamber and the piston and causing failure of the diaphragm upon pressure in the chamber exceeding the predetermined level for the driving of the piston.

30. The method of claim 28, further comprising holding a piston until the pressure in the chamber reaches the predetermined level and then releasing the piston for the driving of the piston.

31. The method of forming parts, comprising:
providing a chamber;
providing an electrically insulating interior wall in the chamber;
providing a die having a die cavity and fixed and moving die parts;
providing a piston connected to the chamber;
connecting the piston and the moving die part;
filling the die cavity with particulate material;
providing spaced electrodes in the chamber;
providing a fuze between the electrodes in the chamber;
providing a high voltage source;
providing pressurized gas in the chamber;
connecting the high voltage source to the electrode;
vaporizing the fuze;
forming a conducting channel in the pressurized gas by the vaporizing;
causing an arc to form along the conducting channel formed by the vaporized fuze;
rapidly heating the gas with the arc;
increasing pressure in the chamber with the rapidly heated gas;
driving the piston in a direction away from the chamber;
pushing the movable die part toward the fixed die part;
compressing the die cavity;
compacting and consolidating the particulate material to a dense state within the compressed die cavity; and
removing the part from the die cavity.

32. The method of forming parts, comprising:
providing an elongated chamber having opposite longitudinal ends;
providing electrodes at the opposite ends of the chamber;
providing a die having a die cavity and fixed and moving die parts;
providing a piston connected to the chamber;
connecting the piston and the moving die part;
filling the die cavity with particulate material;
providing an insulating interior wall in the chamber;
providing ablatable material in the chamber;
providing a high voltage source across the electrodes;
connecting the high voltage source to the electrodes;
rapidly heating, ablating and vaporizing the ablatable material;
rapidly heating the vaporized material;
increasing pressure in the chamber with the heated vaporized material;
driving the piston in a direction away from the chamber with increased pressure;
pushing the movable die part toward the fixed die part;
compressing the die cavity;
compacting and consolidating the particulate material to a formed part with a dense state within the formed compressed die cavity; and
removing the part from the die cavity.

33. The method of claim 32, wherein the providing the ablatable material comprises providing liquids, solid particles or a liner within the chamber.

34. Apparatus for forming parts, comprising:
a combustion chamber;
a die having a die cavity and fixed and movable die parts;
a piston connected to the chamber;
the piston being connected to the movable die part;
a particulate material filling the die cavity;
a combustible gas mixture pressurizing the chamber for moving the piston and the movable die part upon the pressurizing of the chamber and precompressing the particulate material in the die cavity with the pressurizing;
an ignitor connected to the chamber for igniting the combustible gas mixture, for combusting the combustible gas mixture and increasing pressure in the chamber with combustion products of the combustible gas mixture for driving the piston in a direction away from the chamber, pushing the movable die part into the fixed die, compressing the die cavity and compacting and consolidating the particulate material to a dense state within the compressed die cavity before removing the formed part from the die cavity.

35. The apparatus of claim 34, further comprising means for removing gas from the particulate material.

36. The apparatus of claim 34, wherein the means for removing gas from the particulate material comprises means for forcing gas from the particulate material during the precompressing of the particulate material.

37. The apparatus of claim 35, wherein the means for removing gas from the particulate material comprises a vacuum connection for withdrawing gas from the particulate material in the cavity.

38. The apparatus of claim 34, further comprising an enclosure and an inert gas source for providing an inert atmosphere surrounding the die parts during the precompressing and compacting.

39. The apparatus of claim 34;
wherein the cavity comprises a die chamber and a container within the die chamber;
wherein the container is filled with the particulate material and is disposed within the die chamber;
wherein the movable die part comprises a fluent material in the die chamber; and
wherein the connecting of the piston and the movable die part comprises connecting the piston and the fluent material.

40. The apparatus of claim 39, wherein the fluent material comprises liquid, gel or solid materials;
wherein the particulate material is precompressed within the container; and
wherein the compressing comprises compressing the container.

41. The apparatus of claim 34, further comprising an exhaust for exhausting combustion products from the combustion chamber;
an ejector connected to the fixed die part;
a conduit connected to the exhaust and the ejector for conducting the combustion products to the ejector and for driving the ejector with the combustion products and ejecting the formed part from the die cavity with the combustion products driving the ejector.

42. The apparatus of claim 41, further comprising connecting the ejector and the piston for moving the piston with the ejector.

43. The apparatus of claim 42, further comprising interposing the formed part between the piston and the ejector for pressing upon the formed part with the ejector and with the formed part pressing upon the piston.

44. The apparatus of claim 34, further comprising exhausting combustion products from the combustion chamber.

45. The apparatus of claim 34, the piston having a large cross-sectional area and the movable die part having a small cross-sectional area for intensifying pressure in the die cavity.

46. The apparatus of claim 34, further comprising a heater for warming the die parts and the die cavity.

47. The apparatus of claim 34, further comprising a heater for prewarming the particulate material before filing the die cavity.

48. The apparatus of claim 34, wherein the combustible gas mixture further comprises pressurizing with combustible gases mixed with a diluent.

49. The apparatus of claim 48, wherein the combustible gas mixture comprises about 30 molar percent of combustible gases.

50. The apparatus method of claim 48, wherein the combustible gas mixture comprises about 5 to 45 molar percent of combustible gases.

51. The apparatus of claim 34, wherein the combustible gas mixture pressurizes the chamber at a pressure of from about 1,000 to 6,000 psi.

52. The apparatus of claim 34, wherein the combustible gas mixture comprises mixtures of combustible gas selected from the group of combustible gases consisting of methane, hydrogen, oxygen and air, and a diluent gas selected from the group of gases comprising argon, helium, nitrogen and excess combustible gases.

53. The apparatus of claim 34, further comprising a cooler for cooling the combustion chamber.

54. The apparatus of claim 34, wherein the ignitor is selected from the group of ignitors comprising spark, arc, fuse wire, high voltage ignitors breakdown and surface discharge for creating sparks.

55. The apparatus of claim 34, wherein the ignitor further comprises multiple ignitors in the chamber for igniting the combustible gas mixture at multiple locations in the combustion chamber.

56. The apparatus of claim 34, wherein the combustible gas mixture is adjusted for detonation of the combustible gas mixture.

57. The apparatus of claim 34, wherein the increasing pressure in the chamber with the combustion products comprises increasing pressures to maximums within from hundreds of microseconds to hundred of milliseconds.

58. The apparatus of claim 57, further comprising maintaining the pressures for up to hundreds of milliseconds or more.

59. The apparatus of forming parts, comprising:

a combustion chamber;

a die having a die cavity and fixed and moving die parts;

a piston connected to the chamber and connected to the moving die part;

particulate material filling the die cavity and pressurizing the chamber with a combustible gas mixture;

an ignitor for igniting the combustible gas mixture, combusting the combustible gas mixture and increasing pressure in the chamber with combustion products of the combustible gas mixture;

a retainer connected to the chamber for retaining pressure in the chamber during pressure buildup;

a releaser for releasing pressure for driving the piston in a direction away from the chamber, pushing the movable die part toward the fixed die part, compressing the die cavity and compacting and consolidating the particulate material to a formed part having a dense state within the compressed die cavity before removing the formed part from the die cavity.

60. The apparatus of claim 59, wherein the releasing and the driving comprises driving the piston a predetermined time after the igniting.

61. The apparatus of claim 59, wherein the releasing and the driving of the piston occurs upon pressure in the chamber exceeding a predetermined level.

62. The apparatus of claim 61, further comprising a diaphragm between the chamber and the piston for causing failure of the diaphragm upon pressure in the chamber exceeding the predetermined level for the driving of the piston.

63. The apparatus of claim 61, wherein the retainer further comprises a mechanical retainer for holding the piston until the pressure in the chamber reaches the predetermined level and wherein the releaser releases the piston for the driving of the piston.

64. Apparatus for forming a part, comprising:

a chamber;

an electrically insulating interior wall in the chamber;

a die having a die cavity and fixed and moving die parts;

a piston connected to the chamber and connected to the moving die part;

particulate material filling the die cavity;

spaced electrodes in the chamber;

a high voltage source for connecting to the electrodes;

an expansible material in the chamber;

wherein connecting the high voltage source to the electrode electrodes forms a conducting channel and causes an arc to form along the conducting channel formed by the vaporized fuze, rapidly heats the expansible material with the arc, rapidly increases pressure in the chamber with the rapidly heated expansible material, drives the piston in a direction away from the chamber, pushes the movable die part toward the fixed die for compressing the die cavity, and compacting and consolidating the particulate material to a dense state within the compressed die cavity before removing the part from the die cavity.

65. The apparatus of claim 64, wherein the expansible material is compressed gas, and further comprising providing a fuze extending between the electrodes in the chamber for vaporizing the fuze, which thereby forms the conductive channel.

66. The apparatus of claim 64, wherein the expansible material is ablatable material selected from the group consisting of liquids, particulate solids and solid liners within the chamber.

* * * * *

UNITED STATES PATENT AND TRADEMARK OFFICE
CERTIFICATE OF CORRECTION

PATENT NO.    : 6,767,505 B2
DATED         : July 27, 2004
INVENTOR(S)   : Witherspoon et al.

It is certified that error appears in the above-identified patent and that said Letters Patent is hereby corrected as shown below:

<u>Column 41,</u>
Line 53, change "of" to -- for --.

<u>Column 42,</u>
Lines 41 and 42, delete "electrode".

Signed and Sealed this

Fifth Day of October, 2004

JON W. DUDAS
*Director of the United States Patent and Trademark Office*